United States Patent
Kawano

(10) Patent No.: US 9,422,926 B2
(45) Date of Patent: Aug. 23, 2016

(54) PUMP DEVICE

(75) Inventor: Yuji Kawano, Kumagaya (JP)

(73) Assignee: NIPPON OIL PUMP CO., LTD., Kumagaya-shi (JP)

( * ) Notice: Subject to any disclaimer, the term of this patent is extended or adjusted under 35 U.S.C. 154(b) by 320 days.

(21) Appl. No.: 13/879,622

(22) PCT Filed: Mar. 4, 2011

(86) PCT No.: PCT/JP2011/055030
§ 371 (c)(1),
(2), (4) Date: Apr. 15, 2013

(87) PCT Pub. No.: WO2012/053231
PCT Pub. Date: Apr. 26, 2012

(65) Prior Publication Data
US 2013/0216401 A1 Aug. 22, 2013

(30) Foreign Application Priority Data
Oct. 20, 2010 (WO) .................. PCT/JP2010/068440

(51) Int. Cl.
*F04B 53/20* (2006.01)
*F04B 23/10* (2006.01)
(Continued)

(52) U.S. Cl.
CPC .............. *F04B 23/10* (2013.01); *B01D 21/267* (2013.01); *B04C 3/04* (2013.01); *F04B 23/08* (2013.01);
(Continued)

(58) Field of Classification Search
CPC ........ F04B 23/08; F04B 23/14; F04B 23/023; F04B 53/20; F04B 23/12; B01D 17/0217; B01D 21/267; B01D 45/12; B04C 3/04; B04C 5/26; B04C 2009/007

USPC ................ 417/201, 203, 206, 313; 210/512.2
See application file for complete search history.

(56) References Cited

U.S. PATENT DOCUMENTS 3,723,309 A * 3/1973 Garcia .......................... 210/704
3,941,505 A 3/1976 Nasvytis et al.
(Continued)

FOREIGN PATENT DOCUMENTS

| CN | 1463671 A | 12/2003 |
|----|-----------|---------|
| CN | 200945382 Y | 9/2007 |

(Continued)

OTHER PUBLICATIONS

International Search Report directed to International Patent Application No. PCT/JP2011/055030, 4 pages including English translation dated Apr. 19, 2011.

*Primary Examiner* — Devon Kramer
*Assistant Examiner* — Chirag Jariwala
(74) *Attorney, Agent, or Firm* — Kratz, Quintos & Hanson, LLP

(57) ABSTRACT

The purpose of the present invention is to provide a small, light coolant-pump device equipped with a filter, said coolant-pump device not requiring regular maintenance. The present invention is provided with: a positive-displacement pump (9); a cyclone filter (12) provided on the intake side of the positive-displacement pump; and a non-positive-displacement pump (40) provided on the intake side of the cyclone filter (12). The cyclone filter (12) contains a primary cyclone (20) and a secondary cyclone (30) each provided with a mechanism (outlet (20*c* and 30*c*)) through which separated foreign substances (cutting debris and the like) are expelled. The present invention is set such that the discharge rate of the non-positive-displacement pump (40) is higher than the discharge rate of the positive-displacement pump (9). The positive-displacement pump (9), cyclone filter (12), and non-positive-displacement pump (40) are connected in a vertical straight line.

3 Claims, 18 Drawing Sheets

(51) Int. Cl.
*F04B 23/12* (2006.01)
*B01D 21/26* (2006.01)
*B04C 3/04* (2006.01)
*F04B 23/08* (2006.01)
*F04B 23/14* (2006.01)
*B04C 9/00* (2006.01)

(52) U.S. Cl.
CPC .............. *F04B 23/12* (2013.01); *F04B 23/14* (2013.01); *F04B 53/20* (2013.01); *B04C 2009/007* (2013.01)

(56) References Cited

U.S. PATENT DOCUMENTS

| | | | |
|---|---|---|---|
| 4,711,720 A * | 12/1987 | Young | 210/512.2 |
| 4,925,372 A | 5/1990 | Hansen | |
| 5,051,065 A | 9/1991 | Hansen | |
| 5,693,221 A * | 12/1997 | Ellinghaus | 210/188 |
| 5,693,225 A * | 12/1997 | Lee | E21B 43/385 166/265 |
| 6,162,355 A * | 12/2000 | Mizuno et al. | 210/167.02 |
| 6,579,334 B2 * | 6/2003 | Oh et al. | 55/426 |
| 7,479,171 B2 * | 1/2009 | Cho | A47L 9/1608 15/350 |
| 7,867,306 B2 * | 1/2011 | Courtney | A47L 9/1625 55/343 |

FOREIGN PATENT DOCUMENTS

| | | |
|---|---|---|
| CN | 201154256 Y | 11/2008 |
| GB | 1361712 | 7/1974 |
| JP | 45-17512 B1 | 6/1970 |
| JP | 46-3534 A | 11/1971 |
| JP | 49-10026 B | 3/1974 |
| JP | 50-145710 A | 11/1975 |
| JP | 57-129300 A | 8/1982 |
| JP | 57-193083 U | 12/1982 |
| JP | 02-121668 A | 5/1990 |
| JP | 2-291489 A | 12/1990 |
| JP | 6-221293 A | 8/1994 |
| JP | 6-229372 A | 8/1994 |
| JP | 2000-288316 A | 10/2000 |
| JP | 2005-279609 A | 10/2005 |

* cited by examiner

PUMP DEVICE

TECHNICAL FIELD

The present invention relates to a pump that sucks and discharges a liquid, and more particularly to a pump device equipped with a filter mechanism to suck and discharge an operating fluid (e.g., a liquid such as sewage water, mud water, polluted water, a lubricant for machine tools, or a coolant) having foreign substances mixed therein.

BACKGROUND ART

Such a pump device is used for, e.g., circulation of a metalworking fluid (a coolant) in a machine tool. In this case, a low-pressure pump having a relatively low discharge pressure and medium-pressure and high-pressure pumps each having a relatively high discharge pressure are prepared, chips produced during machining are removed by using the low-pressure pump, machinability of a tool for deep hole drilling or the like is improved by the medium-pressure and high-pressure pumps, and chips are removed during machining. That is, the pumps are used properly for different purposes.

As the low-pressure pump, a positive-displacement pump such as a centrifugal pump is mainly used. Such a pump is advantageous for a high capacity, and a suction filter comparable to, e.g., a strainer can suffice and is superior in maintenance. However, to obtain a high pressure, impellers must be installed in multiple stages, and a long pump portion requires a large installation space as a drawback of this pump.

As the medium-pressure and high-pressure pumps, a positive-displacement pump such as trochoidal pump is superior in efficiency.

However, to obtain a high capacity using the positive-displacement pump, a high-capacity rotor is required, and a main body is also large in size. Further, the pump may possibly fail to operate properly due to jamming by foreign substances, and therefore a filter is required on the intake side. As a result, a pipe fitting working takes long time, and a filter needs regular maintenance.

Therefore, as the medium-pressure and high-pressure pumps, a non-positive-displacement pump is often adopted except for cases that discharge must be carried out at a high pressure that is substantially impossible to carry out when the non-positive-displacement pump is used.

Here, if foreign substances are mixed in a coolant used for a machine tool, they can be a cause of scratches of a material during machining or abrasion or damage of the tool. Therefore, for example, a sludge removal device is installed in a tank, a strainer for protecting pump is provided, or a filter is disposed separately from a suction filter, and then a clean coolant is supplied.

In particular, in case of a coolant liquid supplied using a high-pressure pump, since an ejected liquid may have a high velocity in some cases, an influence of foreign substances in the coolant on a material being machined is also considerable. Therefore, the coolant liquid must be cleaned in a rigorous manner.

For example, to clean an operating fluid like a coolant, various kinds of technologies have been conventionally suggested.

According to the prior art concerning a coolant pump equipped with a general type filter, the filter is disposed on the intake side of a positive-displacement pump driven by an electric motor. However, since a filter element is used for filtration, the filter element must be periodically cleaned or replaced.

Moreover, since the pump is heavy in weight because of its structure, it must be installed on a firm large platform that can bear the heavy weight. Additionally, since this prior art is large in size, it has a problem that installation is impossible unless a large installation space is present.

As another prior art, for example, there has been suggested a construction in which an impeller that rotates by an electric motor is connected to the intake side or the outflow side of a cyclone filter and a pump is arranged on the outflow side of this impeller (refer to Patent Literature 1).

However, since foreign substances stay in the cyclone filter according to this prior art, an operation for periodically removing the foreign substances which staying in the cyclone filter is required. Further, this prior art has a drawback that the impeller does not have self-priming properties and a liquid cannot be discharged until the impeller gets wetted.

Alternatively, a construction in which a centrifugal pump is provided on the outflow side of a cyclone filter has been also suggested (refer to Patent Literature 2). Furthermore, a construction in which an axial flow pump is provided on the outflow side of a cyclone filter has been also suggested (refer to Patent Literature 3).

However, these the prior arts (Patent Literature 2, Patent Literature 3) likewise require an operation for removing foreign substances staying in the cyclone filter. Moreover, since self-priming properties are not provided, a device constructed to suck (bring in) an operating fluid is additionally required on the intake side.

CITATION LIST

Patent Literature

Patent Literature 1: Japanese Patent Application Non-examined Publication Gazette No. 2005-279609 (JPA 2005-279609)
Patent Literature 2: Japanese Patent Application Examined Publication Gazette No. S49-10026 (JPB S49-10026)
Patent literature 3: Japanese Patent Application Non-examined Publication Gazette No. H6-221293 (JPA H6-221293)

DISCLOSURE OF INVENTION

Technical Problem

In view of the above-described problems of the prior arts, it is an object of the present invention to provide a lightweight small pump device that does not require regular maintenance and has self-priming properties.

Solution to Problem

A pump device (P1, P2) according to the present invention comprises: a positive-displacement pump (e.g., a trochoidal pump 9) (which is driven by, e.g., an electric motor 1); a cyclone filter (12) provided on an intake side of the positive-displacement pump (9); and a non-positive-displacement pump (a centrifugal pump, an impeller 40) provided on an intake side of the cyclone filter (12), wherein the cyclone filter (12) comprises a primary cyclone (20) and a secondary cyclone (30), each of the primary cyclone (20) and the secondary cyclone (30) is equipped with a mechanism (an outlet 20c, 30c) through which separated foreign substances (chips and the like) are expelled, a discharge rate of the non-positive-displacement pump (40) is set higher than a discharge rate of the positive-displacement pump (9), and the positive displacement pump (9), the cyclone filter (12), and the non-positive-displacement pump (40) are linearly coupled and arranged in a vertical direction.

In the present invention, it is preferable to arrange a secondary rotary pump (a secondary impeller 60) in a space through which an outflow (20b) of the primary cyclone (20) and an intake (30a) of the secondary cyclone (30) communicate each other (refer to FIG. 9 to FIG. 11).

Furthermore, a pump device (P3 to P6) according to the present invention comprises: a positive-displacement pump (e.g., a trochoidal pump 9) (driven by, e.g., an electric motor); a cyclone filter (120) provided on an intake side of the positive-displacement pump (9); and a non-positive-displacement pump (a centrifugal pump, a contamination expelling impeller 400) provided on an outlet side of the cyclone filter (120), wherein the cyclone filter (120) comprises a primary cyclone (200, 200A) and a secondary cyclone (300), each of the primary cyclone (200, 200A) and the secondary cyclone (300) is equipped with a mechanism (an outlet 200c, 300c) through which separated foreign substances (chips and the like) are expelled, the positive-displacement pump (9), the cyclone filter (120), and the non-positive-displacement pump (400) are linearly coupled and arranged in a vertical direction; and the non-positive-displacement pump (400) has a function for sucking an operating fluid containing the foreign substances expelled from the primary cyclone (200, 200A) and the secondary cyclone (300) (or a function for sucking, pressurizing, and expelling to the outside) (refer to FIG. 12 to FIG. 24, FIG. 27 to FIG. 29).

In the pump device (P4, P6) according to the present invention, it is preferable to arrange a secondary rotary pump (a secondary impeller 600) in a space through which an outflow (200b) of the primary cyclone (200, 200A) and an intake (300a) of the secondary cyclone (300) communicate each other (refer to FIG. 25, FIG. 26, and FIG. 30).

Moreover, it is preferable to set a discharge rate of the secondary rotary pump (the secondary impeller 600) to be higher than a discharge rate of the positive-displacement pump (9).

In case of embodying the pump device (P5, P6) according to the present invention, it is preferable that a partition (a partition plate 450b) that separates a space (Ca) communicating with an outlet (300c) of the secondary cyclone (300) from a space (Cb) accommodating the non-positive-displacement pump (400) is provided, and a lower end portion of an outlet (200c) of the primary cyclone (200A) is extended to a position close to the partition (450b).

Advantageous Effects of Invention

According to the pump device of the present invention having the above-described construction, since the primary cyclone (20, 200, 200A) and the secondary cyclone (30, 300) are used, a relatively large foreign substance (a solid substance) is separated by the primary cyclone (20, 200, 200A), a relatively small foreign substance (a solid substance) is separated by the secondary cyclone (30, 300), and therefore a clean operating fluid alone is supplied to the positive-displacement pump (9), thus improving the life duration of the positive-displacement pump (9).

Further, since the mechanisms (the outlets 20c, 200c, 30c, 300c) from which the separated solid substance is expelled are provided to the primary cyclone (20, 200, 200A) and the secondary cyclone (30, 300), the solid substance separated by the primary cyclone (20, 200, 200A) and the secondary cyclone (30, 300) is discharged from the mechanisms (the outlets 20c, 200c, 30c, 300c) from which the solid substance is expelled without staying in the primary cyclone (20, 200, 200A) and the secondary cyclone (30, 300). Therefore, an operation for removing the solid substance from the inside of each of the primary cyclone (20, 200, 200A) and the secondary cyclone (30, 300) does not have to be additionally performed, and a so-called maintenance-free state can be realized with respect to the filter configuration.

Furthermore, according to the present invention, since a discharge rate of the non-positive-displacement pump (40) is set higher than that of the positive-displacement pump (9) which discharges a clean liquid, a negative pressure can be prevented from being produced in the primary cyclone (20) and/or the secondary cyclone (30) due to an intake negative pressure at the intake of the positive-displacement pump (9), and a reverse flow of the operating fluid from the outlet (20c, 30c) can be avoided.

Therefore, the foreign substances mixed in the operating fluid, which has flowed back, can be prevented from being sacked into the positive-displacement pump (9).

Moreover, according to the present invention, since the positive-displacement pump (a trochoidal pump 9), the cyclone filter (12, 120), and the non-positive-displacement pump (40, 400) are linearly coupled and arranged in the vertical direction, the entire pump device can be downsized. Additionally, an installation space can be eliminated.

According to the present invention, self-priming properties of the trochoidal pump (9) can be assured, by means of arranging the outlet (20c, 200c) of the primary cyclone, the outlet (30c, 300c) of the secondary cyclone and the strainer (26ST) being below a liquid level of the operating fluid (e.g., a coolant).

Further, since the non-positive-displacement pump (40, 400) is integrated with the positive-displacement pump (9) and the cyclone filter (12, 120), additional installation of a filter on the intake side which is required in the prior arts is no longer necessary.

Furthermore, according to the present invention, since the clean high-pressure coolant can be supplied from the positive-displacement pump (9) if the operating fluid is a coolant for a machine tool, a machining accuracy of the machine tool can be improved.

In the present invention, if the secondary rotary pump (the secondary impeller 60, 600) is arranged in the space through which the outflow (20b, 200b) of the primary cyclone (20, 120) communicates with the intake (20a, 300a) of the secondary cyclone (30, 300), a flow velocity of a swirl flow (Cn, F7x) in the secondary cyclone (30, 300) is increased, and fine foreign substances can be separated from the operating fluid.

Moreover, as a result of applying the head to the operating fluid by the secondary rotary pump (the secondary impeller 60, 600), a discharge pressure in the secondary cyclone (30, 300) increases, and suction of the operating fluid into the positive-displacement pump (the trochoidal pump 9) can be facilitated by a synergistic effect with a negative pressure at the intake of the positive-displacement pump (the trochoidal pump 9).

Additionally, since the head is applied by the secondary rotary pump (the secondary impeller 60, 600) and a pressure in the secondary cyclone (30, 300) is increased, even if a negative pressure is present at the intake of the positive-displacement pump (the trochoidal pump 9), a generation of negative pressure in the secondary cyclone (30, 300) can be prevented.

In the pump device (P3 to P6) according to the present invention, when the non-positive-displacement pump (400) is constructed to have a function for sucking the operating fluid containing foreign substances discharged from the primary cyclone (200, 200A) and the secondary cyclone (300), the foreign substances (contaminations) discharged from the primary cyclone (200, 200A) and the secondary cyclone (300) can be easily supplied to the processing mechanism (refer to FIG. 21 to FIG. 24) from the discharge port of the non-positive-displacement pump (400), instead of being returned to the operating fluid storage container (e.g., a coolant tank).

Therefore, the operating fluid storage container (e.g., the coolant tank) can be maintained in a clean state for a long period of time.

Further, in the pump device (P5, P6) according to the present invention, in a case that the partition (a partition plate 450b) which separates the space (Ca) communicating with the outlet (300c) of the secondary cyclone (300) from the space (Cb) accommodating the non-positive-displacement pump (400) therein is provided and the lower end portion of the outlet (200c) of the primary cyclone (200A) is extended to the vicinity of the partition (450b), a flow of the coolant (F8, F8x) containing the contaminations discharged from the secondary cyclone (300) is blocked by the primary cyclone (200A) having the outlet (200c) whose lower end portion is extended to the vicinity of the partition (450b) even though this flows is about to flow back into the primary cyclone (200A).

Furthermore, even if a flow of the coolant (F12) containing the contaminations from the primary cyclone (200A) is about to flow back into the secondary cyclone (300), since the lower end portion of the outlet (200c) of the primary cyclone (200A) is placed near the partition (450b), the flow of the coolant (F12) is sucked into the space (Cb) in which the non-positive-displacement pump (400) is positioned.

DESCRIPTION OF EMBODIMENTS

Embodiments according to the present invention will be described hereinafter with reference to the accompanying drawings.

Drawings of FIG. 1 to FIG. 8 show a first embodiment according to the present invention.

Figure 1:
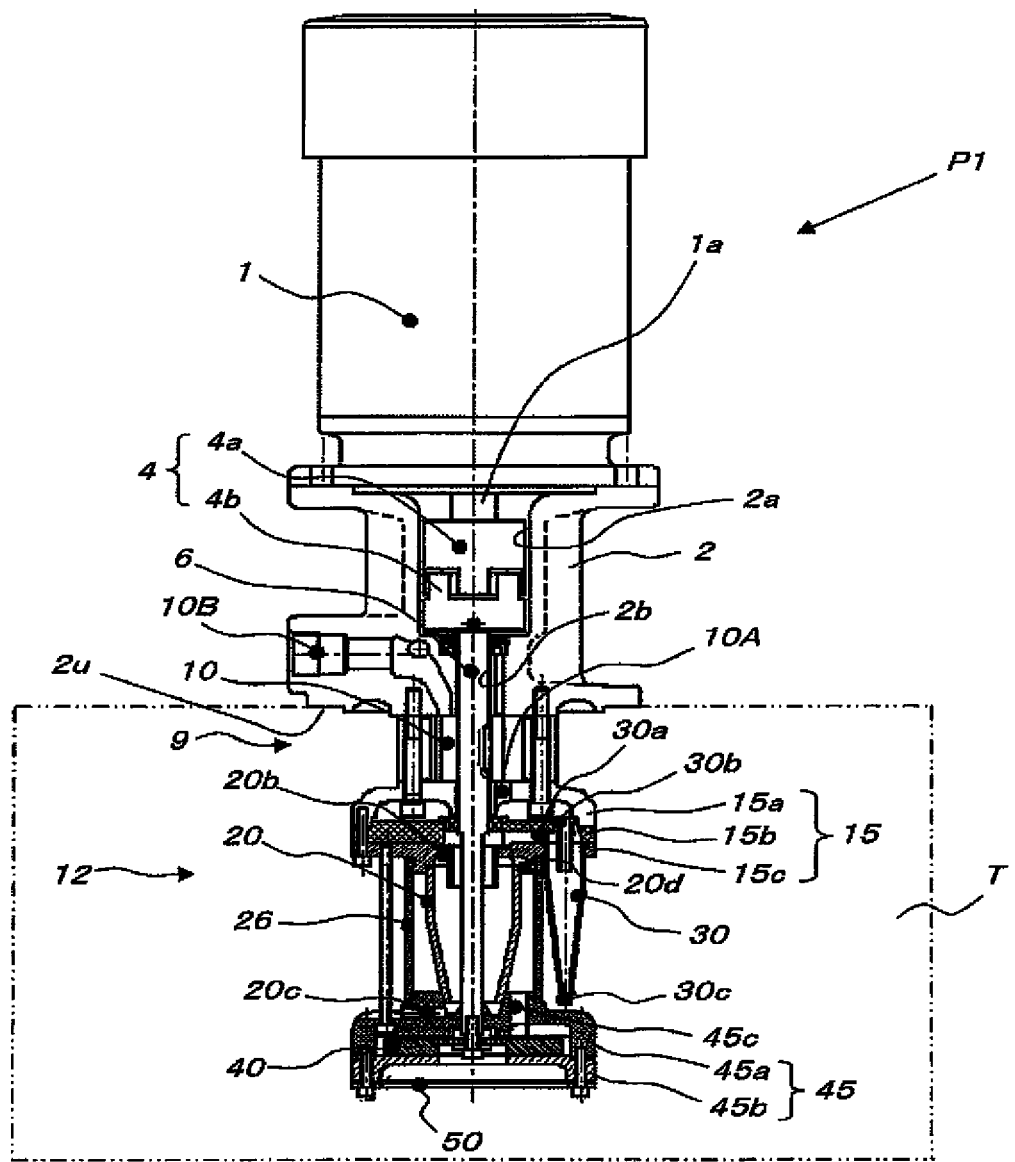
FIG. 1 is a sectional side elevation view showing a first embodiment according to the present invention.

In FIG. 1, a pump device entirely denoted by reference numeral P1 comprises an electric motor 1, a platform portion 2, a trochoidal pump 9, and a cyclone filter 12.

The electric motor 1 is arranged on an upper surface of the platform portion 2, and a lower surface 2u of the platform portion 2 is arranged on an upper surface of a coolant tank T.

In FIG. 1, the trochoidal pump 9 is disposed below the platform portion 2.

Here, the trochoidal pump 9 is a pump which discharges an operating fluid by using a volume change caused due to engagement of a trochoidal motor 10 comprising an inner rotor and an outer rotor. Moreover, the cyclone filter comprehensively denoted by reference numeral 12 is disposed below or on the intake side of the trochoidal pump 9.

A drive shaft 1a of the electric motor 1 is extended to the lower side. A coupling 4 is disposed to a lower end portion of the drive shaft 1a. The coupling 4 comprises an upper coupling 4a fixed to the drive shaft 1a and a lower coupling 4b attachable to/detachable from the upper coupling 4a.

A shaft 6 having a smaller diameter than the drive shaft 1a is disposed below the lower coupling 4b. The rotor 10 of the trochoidal pump 9 is secured to the shaft 6.

Figure 3:
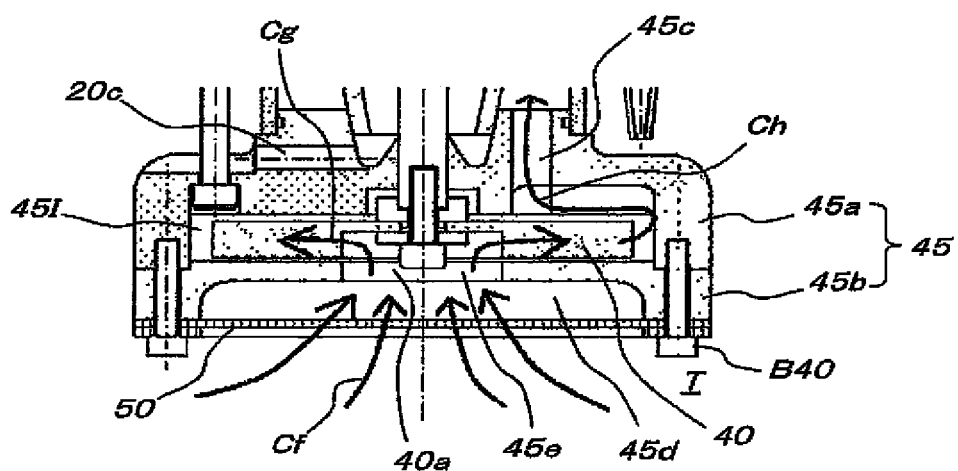
FIG. 3 is a cross-sectional view showing an impeller casing and a flow of a coolant.

The shaft 6 is extended to the lower side of the cyclone filter 12 through the rotor 10. As shown in FIG. 3, an impeller 40 is fastened to a lower end portion of the shaft 6.

In FIG. 1, a central space portion 2a is formed in the platform portion 2, and the coupling 4 is rotatably arranged in the central space portion 2a.

A through hole 2b is formed below the central space portion 2a, and the shaft 6 is rotatably supported in the through hole 2b.

Figure 7:
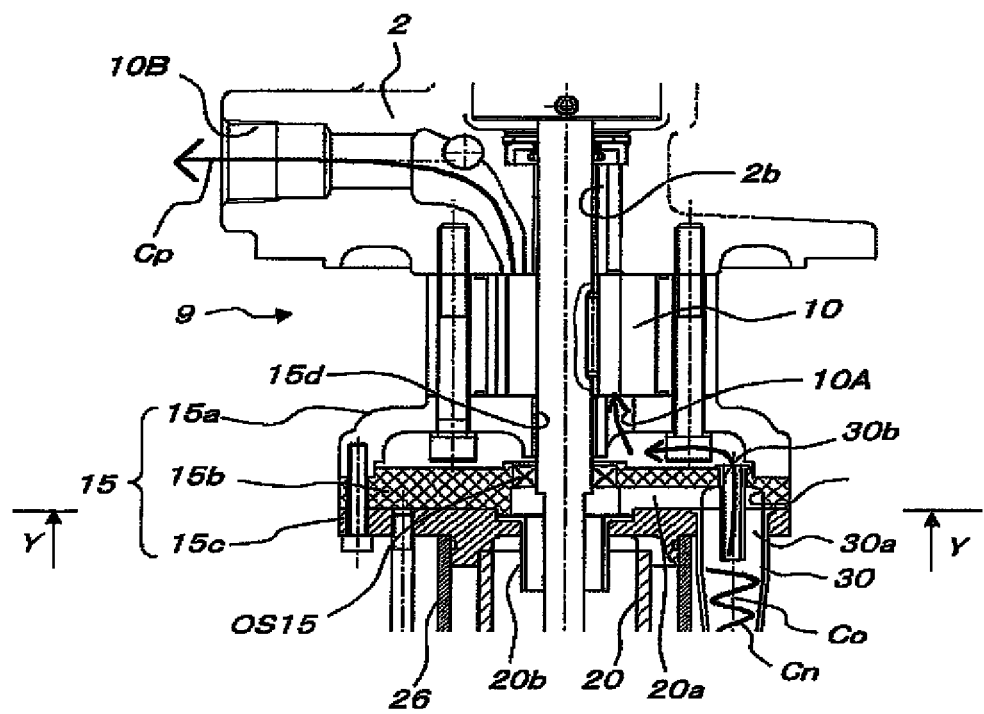
FIG. 7 is a cross-sectional view showing a flow of the coolant that flows out from the secondary cyclone and is discharged from a pump discharge port.

As shown in FIG. 1 and FIG. 7, a trochoidal pump discharge port 10B is formed in outside of the through hole 2b in the radial direction. The trochoidal pump discharge port 10B communicates with, e.g., a position that requires lubrication or a position that requires cooling in a non-illustrated machine tool.

In FIG. 1, the cyclone filter 12 comprises a central casing 15, a primary cyclone 20, a secondary cyclone 30, and an impeller casing 45.

As shown in FIG. 1 and FIG. 7, the central casing 15 comprises an upper member 15a, a central member 15b, and a lower member 15c.

The upper member 15a is secured to the platform portion 2 through the trochoidal pump 9. A through hole 15d is formed in the upper member 15a, and the shaft 6 is rotatably supported in the through hole 15d.

The central member 15b comprises an oil seal OS15, and the oil seal OS15 closely slides on the shaft 6 and prevents to enter foreign substances into an intake 10A of the trochoidal pump 9.

Additionally, secondary cyclone intakes 30a and secondary cyclone outflows 30b of a plurality of secondary cyclones 30 are arranged in the central member 15b, and the secondary cyclone intakes 30a and the secondary cyclone outflows 30b are provided in upper regions of the plurality of secondary cyclones 30.

Here, each guide groove 20a is formed below the central member 15b, and the guide groove 20a communicates with each secondary cyclone intake 30a.

Figure 8:
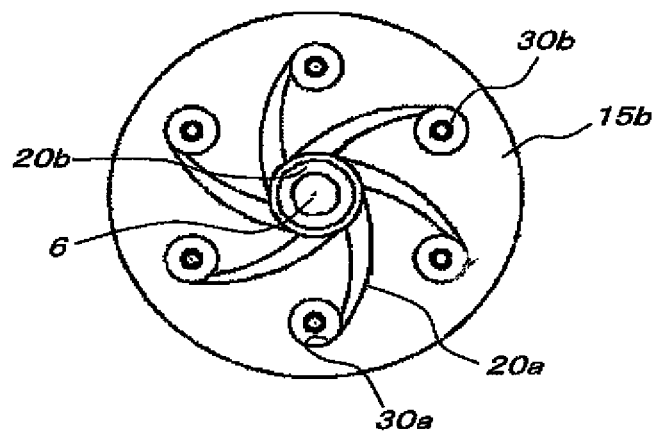
FIG. 8 is a cross-sectional view taken along a line Y-Y in FIG. 7.

As shown in FIG. 8 which is a cross-sectional view taken along a line Y-Y in FIG. 7, the shaft 6 is inserted into the center portion of the central member 15b, and the plurality of curved guide grooves 20a are formed outside the shaft 6 in the radial direction. An inner end portion in the radial direction of each guide groove 20a communicates with the primary cyclone outflow 20b, and an outer end portion in the radial direction of the guide groove 20a communicates with the secondary cyclone intake 30a.

The outer end portion in the radial direction of the guide groove 20a (which communicates with the secondary cyclone intake 30a) is constructed as a notch, the notch position communicates with a tangential direction of each secondary cyclone intake 30a, and the notch is connected with the secondary cyclone intake 30a so as to prevent a generation of step part on a boundary between these members. In a case that the notch at the outer end portion in the radial direction of the guide groove 20a is connected with the secondary cyclone intake 30a so as not to form a step part, a coolant efficiently flows into each secondary cyclone 30.

As shown in FIG. 7, a center portion of the lower member 15c supports an outflow 20b of the primary cyclone 20.

Upper portions of the plurality of secondary cyclones 30 are fixed to an outer peripheral edge portion in the radial direction of the lower member 15c.

Further, the lower member 15c supports the upper portion of the primary cyclone 20 and also supports a primary cyclone casing 26.

The cyclone filter 12 has the primary cyclone 20 that separates relatively large foreign substances and the plurality of secondary cyclones 30 that separate relatively small foreign substances.

Figure 4:
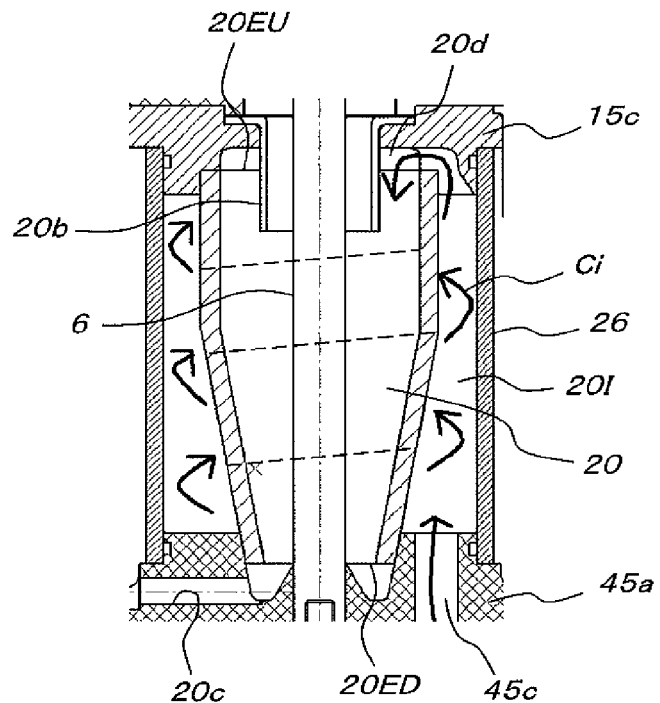
FIG. 4 is a cross-sectional view showing a flow of the coolant until the coolant flows into a primary cyclone.
Figure 5:
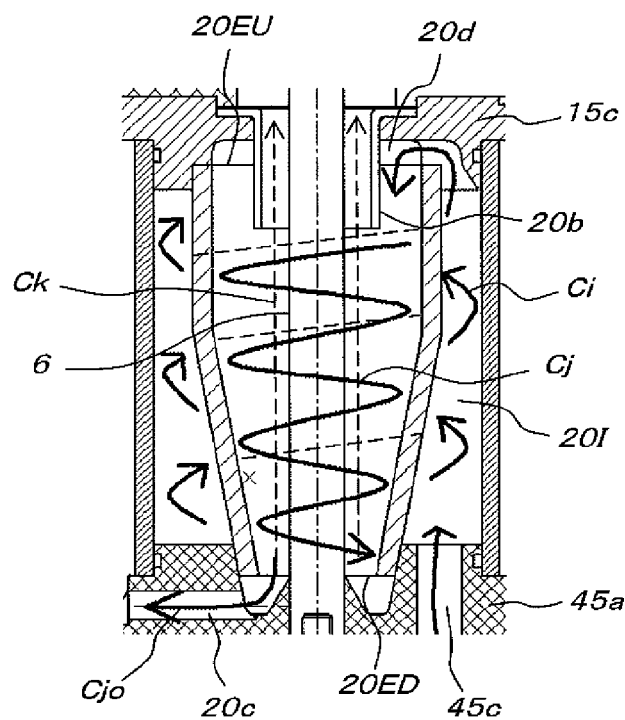
FIG. 5 is a cross-sectional view showing a flow of the coolant after the coolant has flowed into the primary cyclone.

As shown in FIG. 4 and FIG. 5, the primary cyclone 20 is accommodated in the primary cyclone casing 26 in the radial direction and has an intake 45c communicating with a discharge portion of the impeller 40. Furthermore, an annular space 20I between the primary cyclone 20 and the primary cyclone casing 26 forms a channel enabling the intake 45c to communicate with the intake 20d of the primary cyclone 20.

A notch is present between an upper edge portion 20EU of the primary cyclone 20 and the lower member 15c and forms an intake (a primary cyclone intake) 20d of the primary cyclone 20.

A primary cyclone outflow 20b is provided in an upper region of the primary cyclone 20.

The shaft 6 is inserted in a radial direction inner space in the primary cyclone outflow 20b. In other words, it is constructed that the primary cyclone outflow 20b is arranged to surround the shaft 6, and that the coolant flowing from the primary cyclone 20 toward the secondary cyclone 30 flows through an annular space between an outer peripheral surface of the shaft 6 and an inner peripheral surface of the primary cyclone outflow 20b.

As obvious from FIG. 4 and FIG. 5, the primary cyclone 20 has the same diameter from the upper side toward the center, but it is formed into a shape whose diameter is reduced from the center toward the lower side.

A lower end portion 20ED of the primary cyclone 20 is supported by an upper casing 45a. Furthermore, the lower end portion 20ED of the primary cyclone 20 communicates with a primary cyclone outlet 20c.

The plurality of secondary cyclones 30 are arranged on the peripheral edge portion of the primary cyclone casing 26.

In order to remove fine foreign substances, a diameter of each secondary cyclone 30 must be reduced, and a velocity of an inner swirl flow (Cn: refer to FIG. 6) in the circumferential direction must be increased. However, when a diameter dimension of each secondary cyclone 30 is reduced, since a discharge rate of each secondary cyclone 30 is equal to an intake of the trochoidal pump 9, a discharge flow velocity of the secondary cyclone 30 becomes too high. Therefore, the plurality of (e.g., six in the illustrated embodiment) secondary cyclones 30 are arranged so that a total discharge rate of the plurality of secondary cyclones 30 can be associated with the intake rate of the trochoidal pump 9. At this time, a discharge rate of the primary cyclone 20 must be adjusted based on an impeller capacity and a discharge displacement of the primary cyclone 20 so that foreign substances cannot be sucked from the outlet 30c of each secondary cyclone 30.

Figure 6:
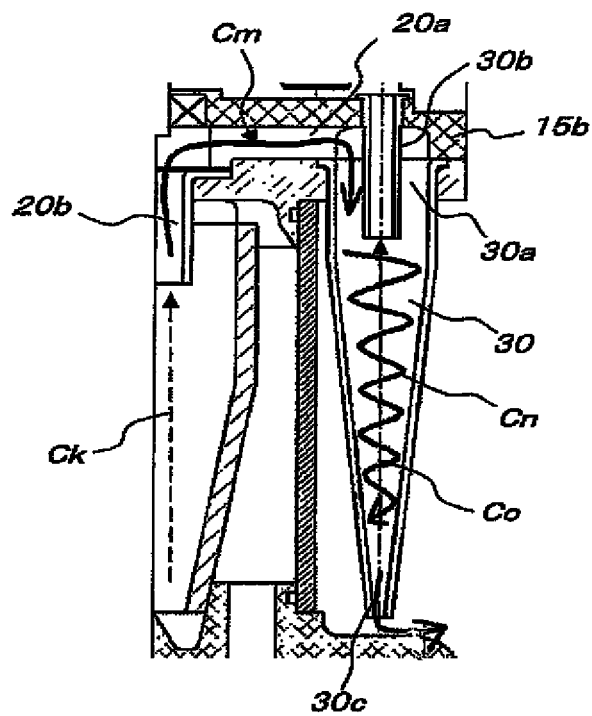
FIG. 6 is a cross-sectional view showing a flow of the coolant that flows out from the primary cyclone and flows into a secondary cyclone.

As shown in FIG. 6, the secondary cyclone intake 30a is provided above each secondary cyclone 30, and the secondary cyclone intake 30a communicates with each guide groove 20a formed on the lower surface side of the central member 15b.

The secondary cyclone outflow 30b is provided on the radial-inner side of the secondary cyclone intake 30a. In other words, the secondary cyclone intake 30a is constructed as an annular space being formed in radial-outside direction of the secondary cyclone outflow 30b.

A secondary cyclone outlet 30c having a small diameter is formed at a lower end portion of the secondary cyclone 30. Relatively small foreign substances mixed in the coolant are expelled to the outside of the secondary cyclone 30 through the secondary cyclone outlet 30c.

In FIG. 3 and FIG. 4, the impeller casing 45 comprises an upper casing 45a and a lower casing 45b.

An intake 45c for the primary cyclone casing 26 and a primary cyclone outlet 20c are formed in the upper casing 45a.

A concave air gap 45d is formed below the lower casing 45b.

The intake 45c for the primary cyclone casing 26 allows the air gap 45d to communicate with the annular space 20I through the impeller 40. Here, the annular space 20I is formed between the primary cyclone 20 and the primary cyclone casing 26.

The lower casing 45b is fixed to the upper casing 45a using fastening bolts B40.

An intake hole 45e is formed at the central portion of the lower casing 45b, and the intake hole 45e communicates with an impeller intake 40a.

The impeller 40 is arranged in a space 45I between the upper casing 45a and the lower casing 45b. The impeller 40 is secured to a terminal portion of the shaft 6.

Figure 31:
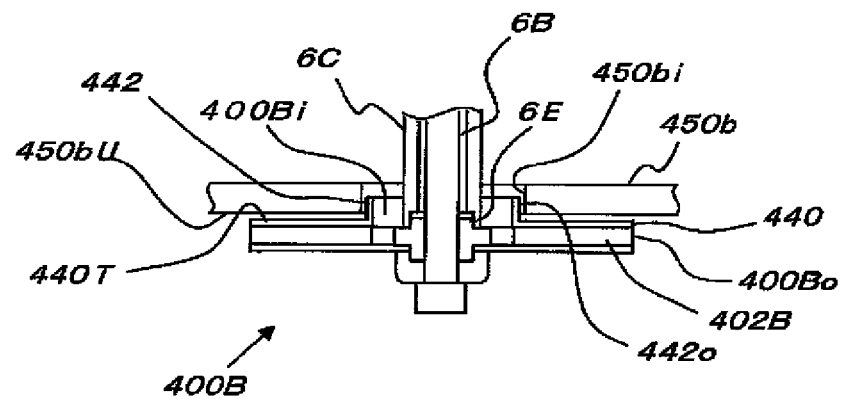
FIG. 31 is a cross-sectional view showing a modification of an expelling impeller.
Figure 32:
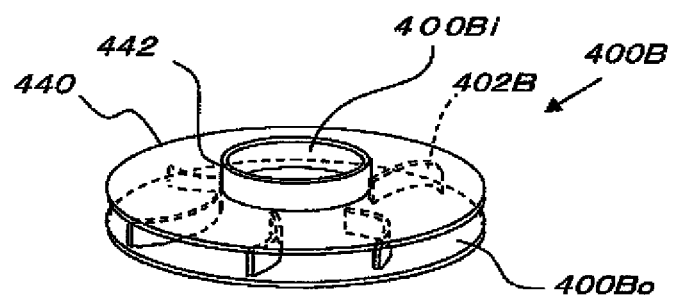
FIG. 32 is a perspective view of the expelling impeller in FIG. 31.

The impeller 40 is constructed to suck a coolant Cf from the impeller intake 40a at a central inner portion and apply a head. Although not shown, a mixed flow pump, an axial flow pump, a centrifugal pump, and any other radial flow pump can be used instead of the impeller 40. Further, the impeller 40 is not restricted to a semi-open impeller shown in FIG. 3, and the impeller may be constructed by an impeller as shown in FIG. 31 and FIG. 32.

A strainer 50 is disposed to a lower edge portion of the lower casing 45b in order to prevent entering large foreign substances into the pump device.

The impeller 40 is constructed so that a discharge rate thereof exceeds a discharge rate of the trochoidal pump 9. This construction is adopted to prevent a generation of negative pressure in the primary cyclone 20 and each secondary cyclone 30, which negative pressure is generated by an intake negative pressure at the pump intake 10A.

In a case that the primary cyclone 20 and each secondary cyclone 30 have a negative pressure, the coolant containing foreign substances may possibly flow back to the primary cyclone 20 and each secondary cyclone 30 from the primary cyclone outlet 20c and/or each secondary cyclone outlet 30c, and then the trochoidal pump 9 may be damaged.

In order to avoid such a risk, the discharge rate of the impeller 40 is set to exceed the discharge rate of the trochoidal pump 9 so that a positive pressure is formed in the primary cyclone 20 and each secondary cyclone 30 and the coolant (containing foreign substances) cannot flow back to the primary cyclone 20 and each secondary cyclone 30 from the primary cyclone outlet 20c and/or each secondary cyclone outlet 30c.

Figure 2:
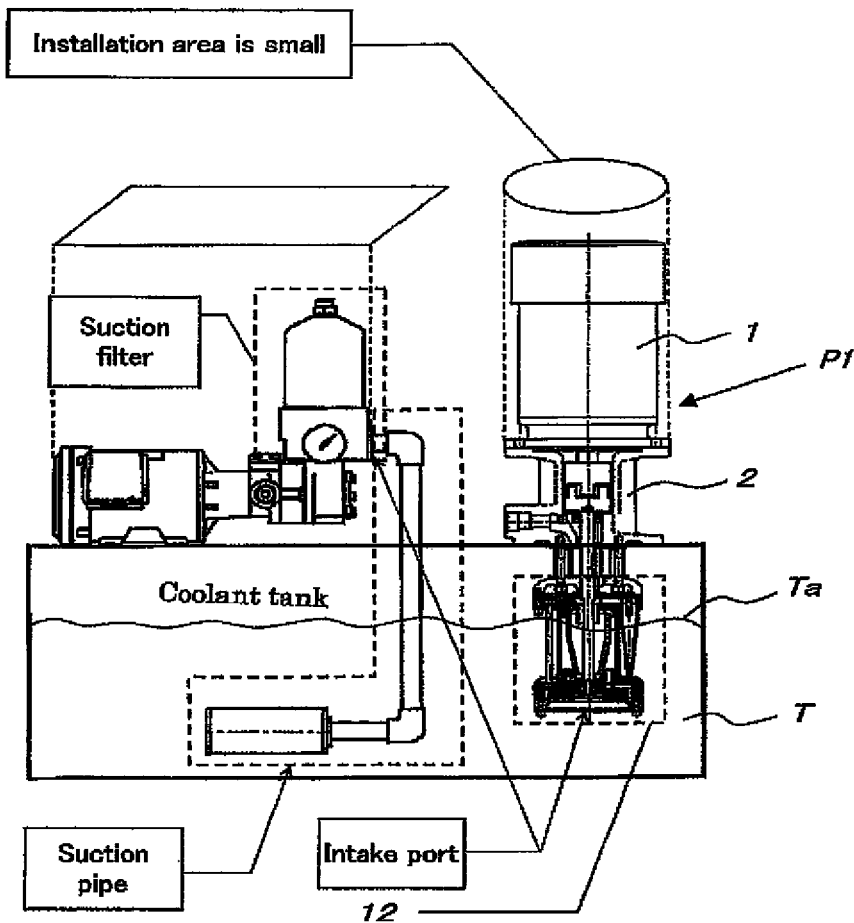
FIG. 2 is an explanatory view showing a pump device according to the first embodiment in comparison to a conventional coolant pump device.

In FIG. 2, the pump device P1 according to the first embodiment is shown in a region on the right-hand side.

The pump device P1 according to the first embodiment has a smaller installation area or projection area than a conventional pump device shown in a region on the left-hand side in FIG. 2. That is because, in the pump device P1 according to the first embodiment, the motor 1, the trochoidal pump 9, the cyclone filter 12, and the impeller 40 are arranged on one vertical straight line.

In FIG. 2, since the impeller 40 is placed below a liquid level Ta in the coolant tank T, the pump device P1 according to the first embodiment can suck the coolant from the tank T, supply it to the trochoidal pump 9, and feed it to a non-illustrated machine tool without performing so-called "priming" or the like. That is, the pump device P1 in the illustrated embodiment is constructed so as to operate self-priming properties.

A flow of the coolant in the pump device P1 according to the first embodiment will now be described with reference to FIG. 1 to FIG. 8.

In FIG. 1 and FIG. 3, when the impeller 40 rotates, the coolant in the coolant tank T is sucked by the impeller 40 as indicated by arrows Cf. At this time, the strainer 50 removes large foreign substances contained in the coolant. Then, the coolant flows into the impeller 40 via the impeller intake 45e and the impeller intake 40e. A head is applied to the coolant that has flowed into the impeller 40 by rotation thereof, and the coolant is biased toward the outer side radial direction in the space 45I.

The flow Cg of the coolant forms a swirl flow in the space 45I, and the coolant is sucked into the casing intake 45c from the outer peripheral portion of the space 45I through the arc-like guide groove 20a as indicated by an arrow Ch.

Moreover, as shown in FIG. 4, the coolant which has flowed into the space 20I from the casing intake 45c turns and forms a swirl flow of the coolant indicated by arrows Ci, and it flows up while swirling in the space 20I between the primary cyclone 20 and the casing 26 and flows into the primary cyclone 20 through the primary cyclone intake 20d.

Additionally, the coolant turns and forms a swirl flow Cj (refer to FIG. 5) in the primary cyclone 20 and flows in downward direction.

When the swirl flow Cj travels in the primary cyclone 20, large foreign substances being contained in the coolant move or drop downwardly. The settled foreign substances are discharged into the coolant tank T from the primary cyclone outlet 20c as indicated by an arrow Cjo. At the same time, the excess coolant is discharged into the coolant tank T from the primary cyclone outlet 20c.

As shown in FIG. 5, the swirl flow Cj of the coolant which has reached the lower side of the primary cyclone 20 ascends or rises upward direction along the shaft 6 as indicated by arrows Ck (dotted lines). Since the inner diameter of the lower portion of the primary cyclone 20 is reduced, a pressure in the lower portion of the primary cyclone 20 is increased by traveling along with the swirl flow Cj. By means of this increase in pressure, the swirl flow Cj is turned, and then, this flow becomes a flow Ck traveling in upward direction.

The coolant indicated by the arrow Ck flows out through the primary cyclone outflow 20b (from the primary cyclone 20), and it flows into each secondary cyclone 30 from each secondary cyclone intake 30a through each guide groove 20a on the lower surface of the central member 15b as indicated by an arrow Cm.

The swirl flow Cn of the coolant travels in downward direction in each secondary cyclone 30. Additionally, since the inner diameter is reduced, the swirl flow Cn of the coolant travels in a lower region of the secondary cyclone 30 and increases a pressure therein. Therefore, the descending swirl flow Cn turns over, becomes a flow Co, and ascends in each secondary cyclone 30.

Further, the flow Co of the coolant is sucked into the trochoidal pump 9 through each secondary cyclone outflow 30b and the pump intake 10A (refer to FIG. 7).

In FIG. 7, the coolant subjected to pressure increase by the rotor 10 of the trochoidal pump 9 is discharged to the non-illustrated machine tool side as a high-pressure coolant from the pump discharge port 10B, as indicated by an arrow Cp.

Here, a negative pressure at the intake 10A of the trochoidal pump 9 may possibly operate on the primary cyclone 20 and each secondary cyclone 30.

However, as described above, the discharge rate of the impeller 40 is set higher than the discharge rate of the trochoidal pump 9, a larger amount of the coolant than the discharge rate of the trochoidal pump 9 is supplied to the primary cyclone 20 and each secondary cyclone 30, and a negative pressure is not generated in the primary cyclone 20 and each secondary cyclone 30 even if the negative pressure at the intake 10A of the trochoidal pump 9 operates.

Therefore, it is possible to prevent the coolant flows back to the primary cyclone 20 from the primary cyclone outlet 20c of the primary cyclone 20 and also prevent the coolant flows back to each secondary cyclone 30 from the secondary cyclone outlet 30c of each secondary cyclone 30.

The coolant supplied to the non-illustrated machine tool is returned to the coolant tank T (refer to FIG. 2) in a situation that the returned coolant contains chips therein.

Since the chips in the coolant have a high specific weight, they are precipitated on the bottom portion of the coolant tank T. The precipitated chips are expelled to the outside of the coolant tank T as sludge. The coolant remaining in the coolant tank T is again sucked into the pump device in the above-described manner, foreign substances are removed by the primary cyclone 20 and each secondary cyclone 30, and then the coolant is discharged to the non-illustrated machine tool side from the pump discharge port 10B of the trochoidal pump 9.

As described above, in the first embodiment, since the discharge rate of the impeller 40 is set to exceed the discharge rate of the trochoidal pump 9, there can be obtained an advantage that a negative pressure is not formed in the primary cyclone 20 and/or each secondary cyclone 30, a liquid, which must be cleaned, in the coolant tank T does not flow back from the primary cyclone outlet 20c and/or each secondary cyclone outlet 30c, and the coolant containing foreign substances is not sucked into the trochoidal pump 9.

Furthermore, since the foreign substances separated by the primary cyclone 20 are expelled through the primary cyclone outlet 20c and the foreign substances separated by each secondary cyclone 30 are expelled through each secondary cyclone outlet 30c, the foreign substances do not remain in the primary cyclone 20 and each secondary cyclone 30, and therefore an operation for periodically removing the foreign substances from primary cyclone 20 and each secondary cyclone 30 is no longer necessary.

Moreover, the electric motor 1, the trochoidal pump 9, the cyclone filter 12, and the impeller 40 are linearly arranged in the vertical direction, an installation projection area is reduced, and therefore a space-saving advantage can be obtained.

A second embodiment (reference numeral P2 denotes an entire pump device) according to the present invention will now be described with reference to FIG. 9 to FIG. 11. Differences from the first embodiment shown in FIG. 1 to FIG. 8 will be mainly explained below.

Figure 9:
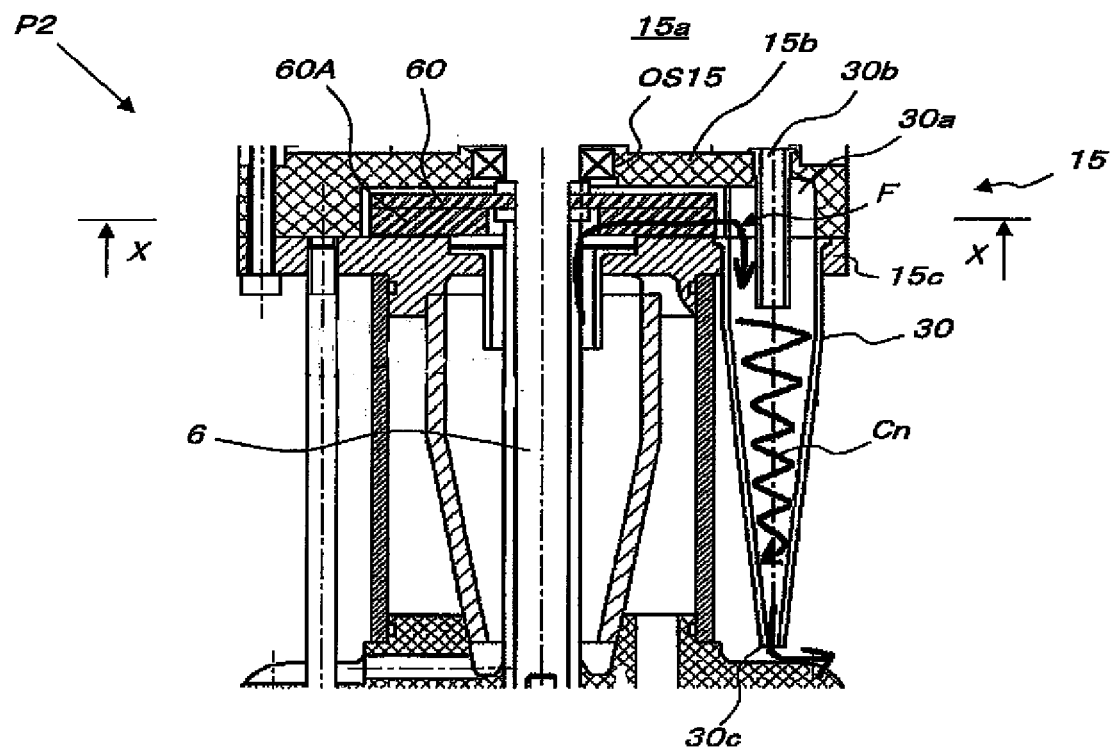
FIG. 9 is a partial cross-sectional view showing a second embodiment according to the present invention.

In FIG. 9, a central casing portion 15 is constituted of an upper member 15a (which is not clearly shown in FIG. 9), a central member 15b, and a lower member 15c.

Additionally, a secondary impeller 60 is arranged in a secondary impeller casing 60c (refer to FIG. 10) which is a space between a lower surface of the central member 15b and the lower member 15c. The secondary impeller 60 is disposed to a shaft 6.

Further, the secondary impeller 60 is not restricted to the semi-open impeller shown in FIG. 3, but it may be such a closed impeller as shown in FIG. 31 and FIG. 32.

Figure 10:
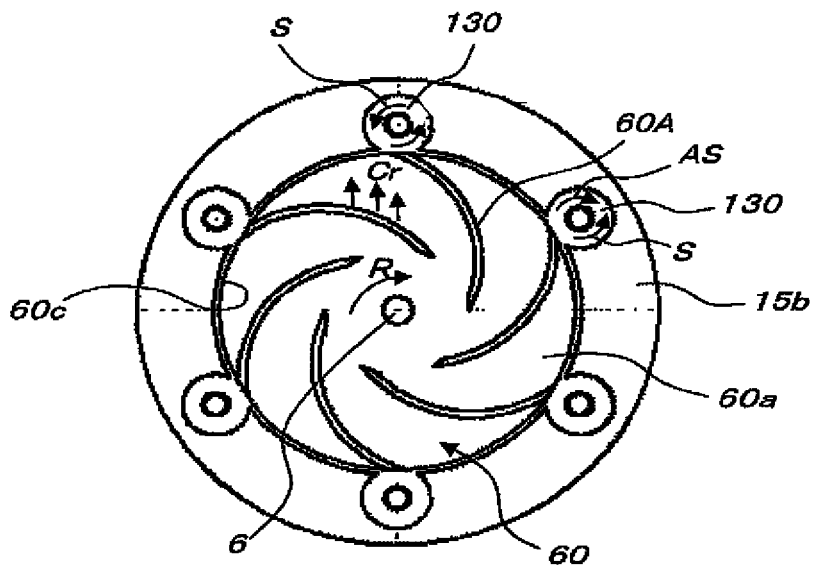
FIG. 10 is a cross-sectional view taken along a line X-X in FIG. 9.

In FIG. 10 showing a cross section taken along a line X-X in FIG. 9, reference numeral 60a denotes a base flat portion of the secondary impeller 60. The secondary impeller 60 is provided with a plurality of curved blades 60A to the base flat portion 60a.

In FIG. 10, notches denoted by reference numeral 130 are formed in the central member 15b on the outer side in the radial direction of the secondary impeller 60. The notches 130 are formed in the circumferential direction of the central member 15b at equal intervals, and they are formed with the same depth as the secondary impeller casing 60c. A cross-sectional shape of each notch 130 is a circle having a missing part.

Secondary cyclones 30 are provided immediately below the respective notches 130.

Like the description of the first embodiment, the device is constructed in such a manner that a step is not produced at a boundary portion between each notch 130 and an inlet 30a of each secondary cyclone 30.

Figure 11:
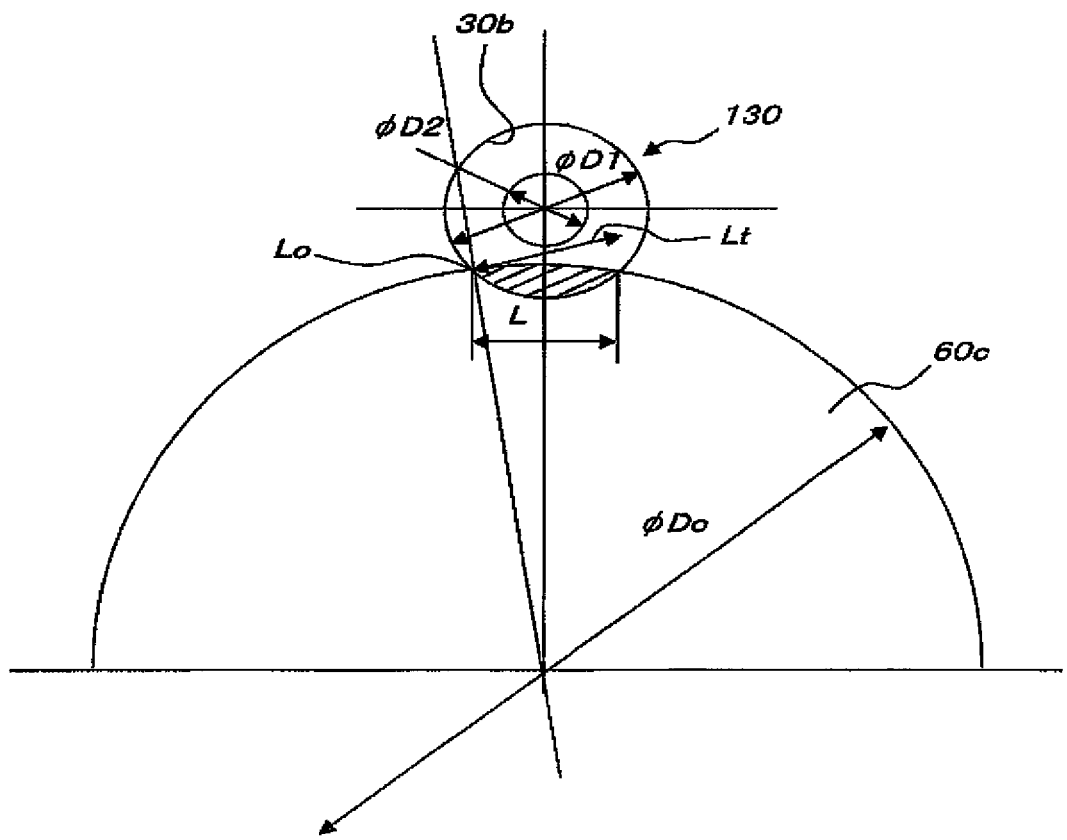
FIG. 11 is an explanatory view showing a relationship between a secondary impeller and a notch communicating with the secondary cyclone.

In FIG. 11 schematically showing the notch 130, a part of the notch that is missing with respect to a precise circle overlaps the secondary impeller casing 60c.

This overlapping part (a hatched part in FIG. 11) will be referred to as an "overlapping part of the notch 130 and the secondary impeller casing 60c" hereinafter.

A width dimension of the overlapping part of the notch 130 and the secondary impeller casing 60c is designated by reference numeral L in FIG. 11. According to an experiment conducted by the present inventor, assuming that an inner diameter of the secondary impeller casing 60c is D0, an inner diameter of the notch 130 (an inner diameter of the intake 30a of the secondary cyclone 30) is D1, and an outer diameter of a secondary cyclone outflow 30b is D2, when D1#13D2 which is generally an optimum dimension of a cyclone is achieved and D0#1(3 to 5)D1 is attained, it is preferable for the width dimension L to meet L=(0.6 to 0.8)×D1.

In FIG. 11, it is preferable to prevent a tangent line Lt (a tangent line of a circle representing the secondary impeller casing 60c) having a left end Lo of the "overlapping part of the notch 130 and the secondary impeller casing 60c" as a base point from running through a circle having an outer diameter D2 representing the secondary cyclone outflow 30b.

A difference of a flow of a coolant from the first embodiment will be mainly described.

In FIG. 10, when the secondary impeller 60 rotates in a direction indicated by an arrow R, the coolant forms a flow indicated by each arrow Cr and flows into each notch 130. Further, the coolant turns to a swirl flow S in each notch 130 and flows into each secondary cyclone intake 30a, thereby forming a swirl flow Cn of the coolant (refer to FIG. 9).

Furthermore, since the swirl flow Cn (refer to FIG. 9) of the coolant is formed by rotation energy of the secondary impeller 60, a flow velocity of the swirl flow Cn is higher than that of the first embodiment, and therefore finer foreign substances can be separated.

When the notches 130 are formed as described above, energy of the swirl flow Cr of the coolant generated by rotation of the secondary impeller 60 is efficiently converted for forming the swirl flow Cn in the secondary cyclones 30 by the coolant.

Here, if the width dimension L of the overlapping part of each notch 130 and the secondary impeller casing 60c is too small, the coolant hardly flows into each notch 130 and each secondary cyclone 30 even though the secondary impeller 60 rotates.

On the other hand, if the width dimension L of the overlapping part of the each notch 130 and the secondary impeller casing 60c is too large, a flow indicated by each arrow AS (refer to FIG. 10) is generated in the notch 130, this flow AS acts to cancel out a swirl flow S, and therefore the energy generated by rotation of the secondary impeller 60 is hardly converted for forming the swirl flow Cn (refer to FIG. 9) in each secondary cyclone 30.

Further, when the overlapping part of each notch 130 and the secondary impeller casing 60c is too large, this part inconveniently overlaps each secondary cyclone outflow 30b.

According to the second embodiment described with reference to FIG. 9 to FIG. 11, since a head is applied to the coolant by the secondary impeller 60 and a flow velocity of the swirl flow Cn in each secondary cyclone 30 is increased, there can be obtained an effect that finer foreign substances can be separated from the coolant in each secondary cyclone 30 as compared with the first embodiment.

Further, as a result of applying the head by the secondary impeller 60, a discharge pressure in each secondary cyclone 30 is increased. An increase in discharge pressure in each secondary cyclone 30 facilitates suction of the coolant into a trochoidal pump 9 as a synergistic effect with a negative pressure in an intake 10A of the trochoidal pump 9 (refer to FIG. 7).

Additionally, since the head is applied by the secondary impeller 60 and the discharge pressure in each secondary cyclone 30 is increased, even if a negative pressure is generated at the intake 10A of the trochoidal pump 90 (refer to FIG. 7), a negative pressure is not generated in each secondary cyclone 30. Therefore, the coolant in a tank T can be further prevented from flowing back (into each secondary cyclone 30) from each secondary cyclone outlet 30c as compared with the first embodiment.

At this time, a discharge rate of the secondary impeller 60 is set higher than a discharge rate of the trochoidal pump 9 like the primary impeller 40.

Structures, functions, and effects other than those described above in the second embodiment are the same as the first embodiment.

A third embodiment according to the present invention will now be described with reference to FIG. 12 to FIG. 24, FIG. 31, and FIG. 32.

It is to be noted that, in FIG. 12 to FIG. 30, the same reference numerals as those used in FIG. 1 to FIG. 11 denote the same constituent elements as those in the embodiment shown in FIG. 1 to FIG. 11.

Figure 12:
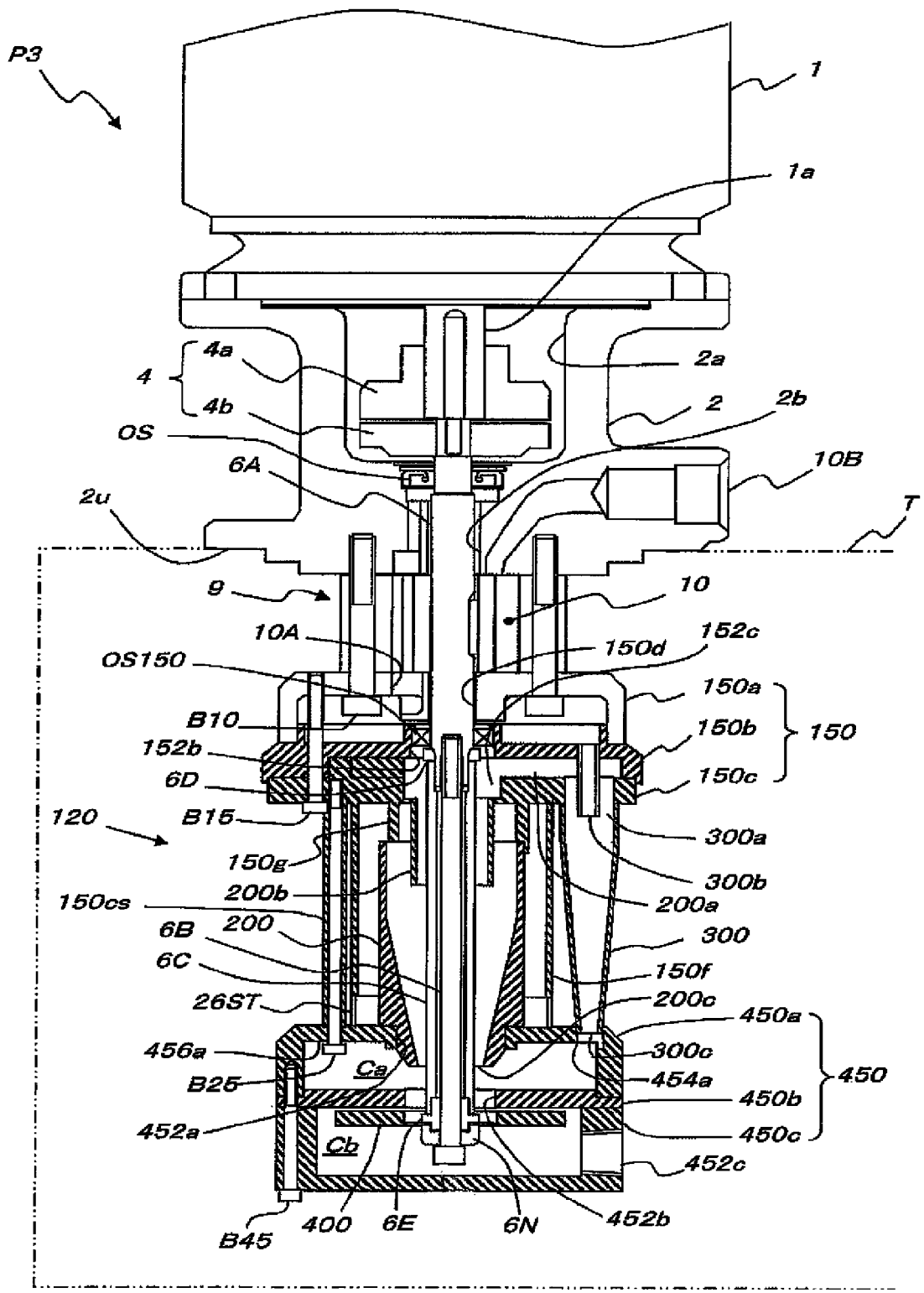
FIG. 12 is a sectional side elevation view showing a third embodiment according to the present invention.

In FIG. 12, an entire pump device according to the third embodiment is denoted by reference numeral P3 and comprises an electric motor 1, a platform portion 2, a trochoidal pump 9, and a cyclone filter 120. An expelling impeller casing 450 is provided below the cyclone filter 120 (in FIG. 12).

A central space portion 2a is formed at the center of the platform portion 2. The central space portion 2a communicates with a lower end side of the platform portion 2 via a through hole 2b to sandwich an oil seal storage chamber which is not clearly shown therebetween. The through hole 2b rotatably supports a shaft 6A.

An oil seal OS is interposed to the oil seal storage chamber which is not clearly shown so that an operating fluid (e.g., a coolant) can be prevented from entering the electric motor 1 side via the through hole 2b.

The electric motor 1 is arranged on an upper surface of the platform portion 2. A lower surface (an attachment surface) 2u of the platform portion 2 is attached to, e.g., an upper surface of a coolant tank T.

A drive shaft 1a of the electric motor 1 is extended in the vertical direction (a lower side in FIG. 12), and a coupling 4 is disposed to a lower end portion of the drive shaft 1a. The coupling 4 comprises an upper coupling 4a fixed to the drive shaft 1a and a lower coupling 4b that is attachable to/detachable form the upper coupling 4a.

The coupling 4 is accommodated in the central space portion 2a of the platform portion 2.

The trochoidal pump 9 is disposed below the platform portion 2. The trochoidal pump 9 is a pump that discharges an operating fluid by using a volume change caused due to engagement of a trochoidal motor 10 comprising an inner rotor and an outer rotor.

A discharge port 10B of the trochoidal pump is formed on the outer side of the through hole 2b in the radial direction in the platform portion 2.

A rotary shaft (which will be referred to as a "pump shaft" hereinafter) 6A of the trochoidal pump 9 is arranged so as to pierce through the trochoidal rotor 10, and it is constructed to integrally rotate with the trochoidal rotor 10.

In FIG. 12, a central casing 150, which is one of constituent necessary elements of the cyclone filter 120, is arranged on a lower end surface side of the trochoidal pump 9.

The cyclone filter 120 comprises the central casing 150, a primary cyclone 200, a plurality of secondary cyclones 300, a cyclone casing 150f, and an expelling impeller casing 450.

The central casing 150 has an upper member 150a, a central member 150b, and a lower member 150c.

The upper member 150a is a lid-like body having an annular outer edge, has a through hole 150d formed at the center thereof, and rotatably supports the pump shaft 6A in the through hole 150d.

A pump intake 10A extended and pierced (in the upper member 150a) in the vertical direction is formed in the upper member 150a, and the pump intake 10A is provided so as to be adjacent to the through hole 150d.

An oil seal storage chamber 152b constructed to store an oil seal OS150 is formed at the center of the central member 150b. The oil seal OS150 is stored in the oil seal storage chamber 152b, and the oil seal OS150 slides on the shaft 6A in close contact and prevents foreign substances from entering the intake 10A of the trochoidal pump 92

A through hole 152c is formed at the center of the lower member 150c, and the through hole 152c accommodates an upper end portion of an extended shaft 6C so as to enable its rotational movement and allows an operating fluid (e.g., a coolant) to pass therethrough.

In FIG. 12, on a lower surface side of the lower member 150c, a primary cyclone outflow 200b, a guide member 150g, the cyclone casing 150f, the plurality of secondary cyclones 300, and a plurality of attachment bolt insertion stems 150cs are disposed (to the lower member 150c). The guide member 150g functions as an inlet of the primary cyclone 200. Here, the primary cyclone outflow 200b, the guide member 150g, the cyclone casing 150f, the plurality of secondary cyclones 300, and the attachment bolt insertion stems 150cs are arranged on the lower member 150c from the central portion in the radial direction to the outer side in the radial direction in the mentioned order.

The through hole 152c in the lower member 150c and respective intakes 300a of the plurality of secondary cyclones 300 are formed to communicate with each other through a plurality of guide grooves 200a. The guide grooves 200a are constituent necessary elements corresponding to the guide grooves 20a shown in FIG. 8, formed in the central member 150b, and has a curved shape within in a plane (two-dimensionally) in the left-and-right direction in FIG. 12.

The primary cyclone outflow 200b on the lower member 150c is constructed as a cylindrical member at the center of the lower member 150c on the lower surface side. The primary cyclone outflow 200b is constructed in such a manner that a part thereof enters the primary cyclone 200.

The guide member 150g on the lower member 150c is formed into, e.g., a cylindrical shape as a whole. Although not clearly shown in FIG. 12, the cylindrically formed guide member 150g is partially notched, and the notched portion is constructed to operate as a primary cyclone outflow.

Further, a lower end of the guide member 150g is constructed to fix and support an upper end of the primary cyclone 200.

The cyclone casing 150f on the lower member 150c is formed into a cylindrical shape, and it fixes a cylindrical strainer 26ST by using a lower end of the cyclone casing 150f and an upper member 450a of the impeller casing 450.

The operating fluid (e.g., a coolant) flows into the pump device P3 through the strainer 26ST. In other words, the strainer 26ST is an inlet for the operating fluid in the pump device P3.

The strainer 26ST exercises a function for preventing large foreign substances from entering the pump device. An outer diameter dimension of the strainer 26ST is set equal to an external dimension of the cyclone casing 150f.

Figure 18:
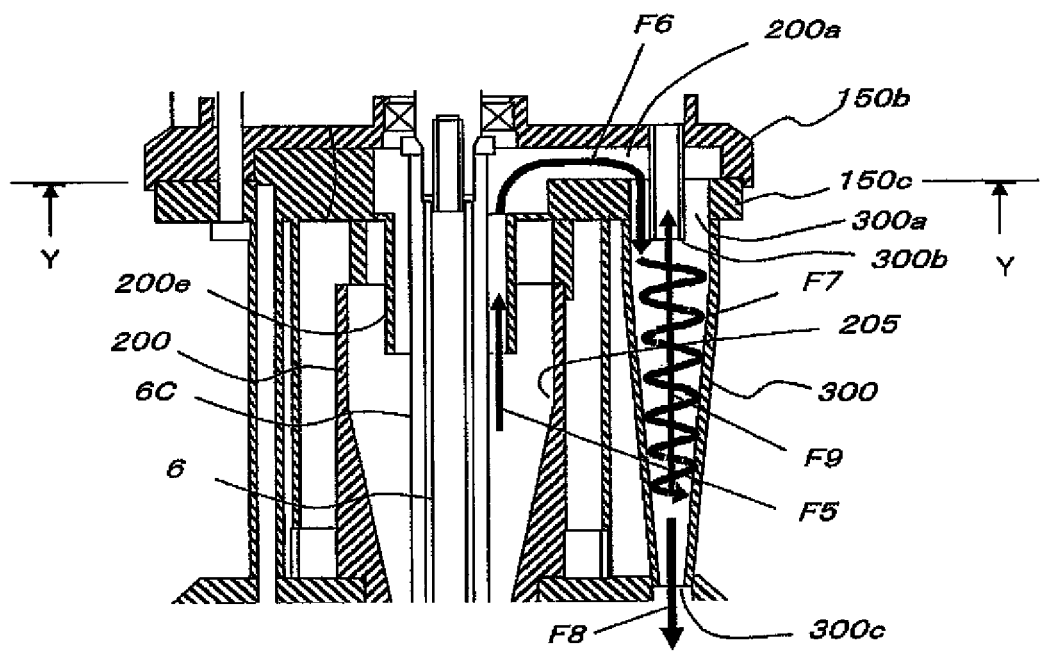
FIG. 18 is a cross-sectional view showing a flow of the coolant that has flowed out from the primary cyclone and has flowed into a secondary cyclone in the third embodiment.

The plurality of secondary cyclones 300 disposed to the lower member 150c are arranged with respect to the primary cyclone 200 and the lower member 150c like the first embodiment. A cross-sectional view of FIG. 18 taken along a line Y-Y is the same as FIG. 8. Therefore, the cross section taken along the line Y-Y of FIG. 18 is not additionally shown.

In FIG. 12, each attachment bolt insertion stem 150cs on the lower member 150c is formed into an elongated cylindrical shape. Further, a shaft portion of an impeller casing attachment bolt B25 is inserted into each attachment bolt insertion stem 150cs having the elongated cylindrical shape.

Of the upper member 150a, the central member 150b, and the lower member 150c, respective members adjacent to each other have a centering location structure, and they are concentrically laminated based on the centering location structure. Furthermore, boundaries between the members 150a, 150b, and 150c have air-tightness by sealing (e.g., an O-ring).

The upper member 150a is disposed to the lower end of the platform portion 2 by a plurality of through bolts B10 in a state that the trochoidal pump 9 is interposed between the upper member 150a and the platform portion 2.

Moreover, the central member 150b and the lower member 150c, which are laminated in advance by the centering location structure, are fastened by a plurality of through bolts B15 with respect to the upper member 150a disposed to the lower end of the platform base 2.

The pump shaft 6A is disposed below the lower coupling 4b. As described above, the rotor 10 of the trochoidal pump 9 is secured to the pump shaft 6A by known means (e.g., a key, a pin, or a cotter).

The pump shaft 6A enters the inside of the lower member 150c in the central casing 150 through the rotor 10. A taper portion 6At whose diameter is reduced toward the distal end is formed near the distal end of the shaft 6A, and a diameter reducing portion 6Ab is extended from this portion to the shaft distal end (refer to FIG. 13).

Figure 13:
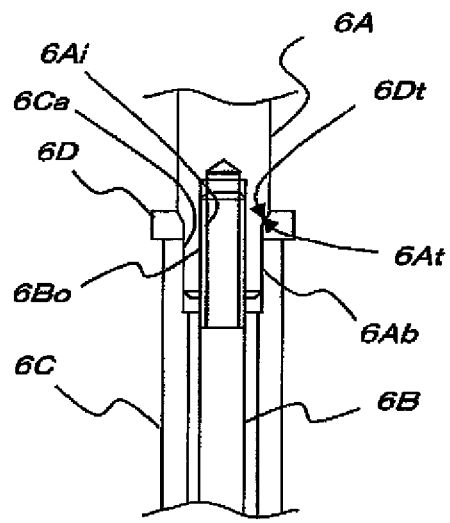
FIG. 13 is a cross-sectional view showing a connecting portion of a pump shaft and an extended shaft in the third embodiment.

In FIG. 13, the cylindrical extended shaft 6C is connected to the lower end of the pump shaft 6A to be integral with the shaft 6A through a seat member 6D by a through bolt 6B. Here, when a male screw 6Bo formed at an upper end of the through bolt 6B is screwed to a female screw 6Ai formed at a lower end of the shaft 6A, the cylindrical extended shaft 6C is connected to the lower end of the pump shaft 6A.

The seat member 6D has an annular shape, and a taper 6Dt having a complementary shape with respect to the taper portion 6At of the shaft 6A is formed on the inner side of the seat member 6D in the radial direction.

An upper diameter expanding portion 6Ca is formed to a hollow portion at the upper end of the extended shaft 6C, and the distal end diameter reducing portion 6Ab of the pump shaft 6A is fitted in this diameter expanding portion 6Ca.

Here, although the pump shaft 6A and the extended shaft 6C are different members in FIG. 13, the pump shaft 6A and the extended shaft 6C may be formed as one shaft.

Figure 14:
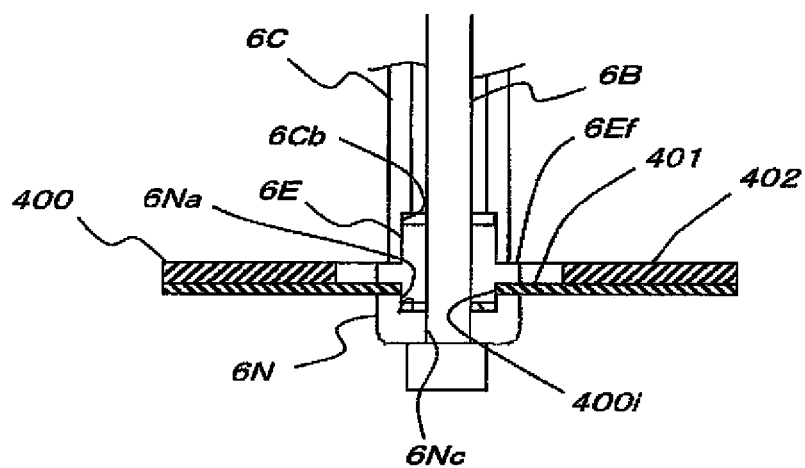
FIG. 14 is a cross-sectional view showing an attachment state of an impeller used in the third embodiment.

As shown in FIG. 14, a lower diameter expanding portion 6Cb is formed to a hollow portion at the lower end of the extended shaft 6C, and a first holding member 6E is fitted in this lower diameter expanding portion 6Cb.

In FIG. 14, a contamination expelling impeller 400 is disposed to the lower end of the extended shaft 6C through the first holding member 6E and the second holding member 6N by the through bolt 6B.

The first holding member 6E has a flange portion 6Ef at the center of the outer peripheral of the cylindrical shape thereof.

The second holding member 6N has a circular dent (a concave portion) 6Na formed in an upper portion thereof and also has a through hole 6Nc into which a shaft portion of the through bolt 6B is inserted is formed at the central portion thereof in FIG. 14.

An outer diameter dimension of the flange portion 6Ef of the first holding member 6E is substantially equal to an outer diameter dimension of the second holding member 6N, and an outer diameter dimension of the shaft portion of the first holding member 6E is equal to an inner diameter dimension of the circular dent (the concave portion) 6Na of the second holding member 6N. Furthermore, the shaft portion of the first holding member 6E on the lower end side and the circular dent (the concave portion) 6Na of the second holding member 6N have the centering location structure.

In the impeller 400, a plurality of blades 402 are radially formed on one surface (an upper surface in FIG. 14) of a thin plate-like member 401 having a through hole 400i at the center with an equal pitch in the circumferential direction.

The shaft portion (the lower side in FIG. 14) of the first holding member 6E is constructed to be fitted to the thin plate-like member 401 of the impeller 400.

The impeller 400 is arranged in such a manner its surface having the blades 402 fixed thereto faces the upper side.

The shaft portion (the lower side in FIG. 14) of the first holding member 6E is inserted into the through hole 400i of the impeller 400. In FIG. 14, the lower end portion of the shaft portion of the first holding member GE penetrates through the thin plate-like member 401 of the impeller 400 and protrudes from the plate-like member 401.

In FIG. 14, the dent (the concave portion) 6Na of the second holding member 6N is fitted to the lower end portion of the shaft portion of the first holding member 6E protruding from the plate-like member 401. Therefore, the first holding member 6E, the impeller 400, and the second holding member 6N are integrated.

In a state that the first holding member 6E, the impeller 400, and the second holding member 6N are integrated, the shaft portion of the through bolt 6B is inserted in the first holding member 6E, the impeller 400, and the second holding member 6N from the through hole 6N of the second holding member 6N on the lower side (a side where the concave portion 6Na is not formed).

The shaft portion (the upper side in FIG. 14) of the first holding member 6E is fitted to the lower diameter expanding portion 6Cb of the extended shaft 6C.

As shown in FIG. 12, a distal end (an upper end in FIG. 12) of the male screw portion 6Bo of the through bolt 6B protrudes from the upper end of the extended shaft 6C. The male screw portion 6Bo of the through bolt 6B protruding from the upper end of the extended shaft 6C is screwed to the female screw 6Ai at the lower end of the pump shaft 6A.

Here, the expelling impeller 400 is not restricted to such a semi-open impeller as shown in FIG. 14, and it may be such a closed impeller as denoted by reference numeral 400B as a whole in FIG. 31 and FIG. 32.

In FIG. 31 and FIG. 32, a closed type impeller 400B has a shroud (a side panel) 440 and a plurality of blades 402B provided therein. Moreover, the shroud 440 has a cylindrical protruding portion 442 constituting an intake 400Bi for an operating fluid (e.g., a coolant). Additionally, the impeller 400B has a discharge port 400Bo formed at an outer end portion thereof in the radial direction.

Figure 20:
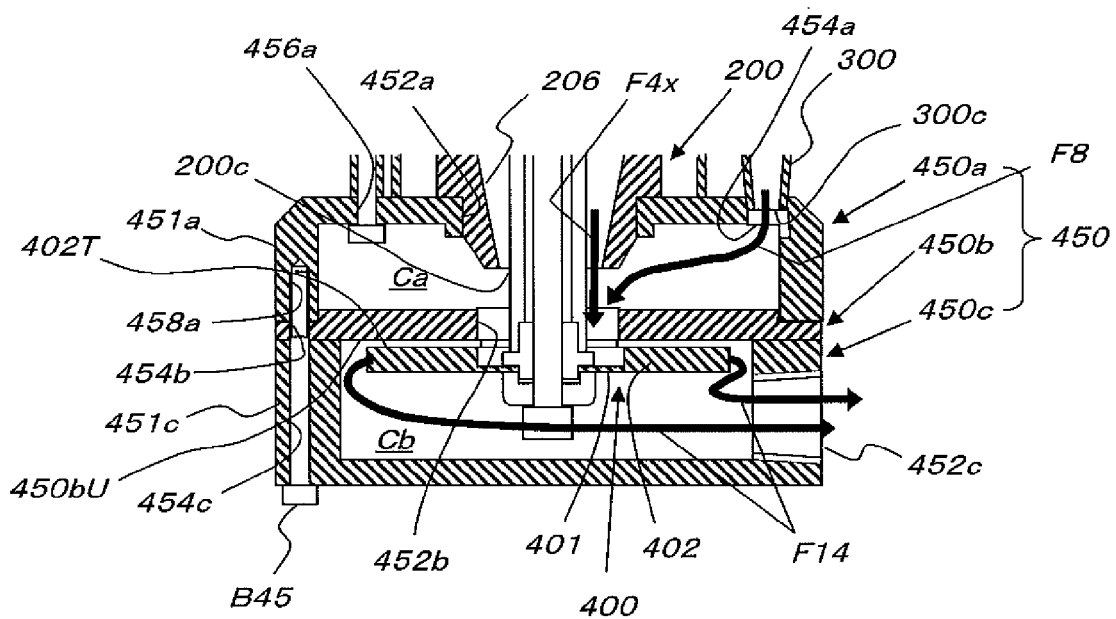
FIG. 20 is a partial cross-section view showing a state that the coolant is expelled from an expelling impeller in the third embodiment.

In such a semi-open impeller as shown in FIG. 14, a gap formed between an upper edge portion 402T of each blade 402 and a lower surface 450bU of a partition plate 450b (which will be described later with reference to FIG. 12 and FIG. 20) must be as small as possible so that no interference can occur in FIG. 20. On the other hand, in the impeller 400B shown in FIG. 31 and FIG. 32, a gap between an upper surface 440T of the shroud 440 in a region extended to the outside in the radial direction and a lower surface 450bU of a partition plate 450b does not have to have a small dimension as long as these members do not interfere with reach other.

However, in FIG. 31, it is preferable to reduce a gap between an outer peripheral surface 442o of the protruding portion 442 of the shroud 440 and an inner peripheral surface 450bi of the partition wall 450b as much as possible so that rotation of the impeller 400B cannot be obstructed. On the other hand, there is no such a request for the semi-open impeller 400 shown in FIG. 14.

It is to be noted that, although not shown, the expelling impeller 400 or 400B may be substituted by a mixed flow pump, an axial flow pump, a centrifugal pump, and any other radial flow pump.

The construction shown in FIG. 13 and FIG. 14 can be also applied to the embodiment shown in FIGS. 1 to 12 and an embodiment shown in FIG. 25 to FIG. 30.

In the third embodiment, the impeller 400 can be substituted by a mixed flow pump, an axial flow pump, a centrifugal pump, and any other radial flow pump like the first embodiment and the second embodiment.

In FIG. 12 and FIG. 20, the impeller casing 450 is constituted of an upper casing 450a, the partition plate 450b, and a lower casing 450c.

In the illustrated example, the upper casing 450a, the partition plate 450b, and the lower casing 450c are set to the same external dimension.

The upper casing 450a of the impeller casing 450 is formed into a lid shape having a cylindrical outer edge 451a.

A through hole 452a is formed at the center of the upper casing 450a, and the primary cyclone 200 is fitted in the through hole 452a.

Through holes 454a are formed at a plurality of positions near an outer edge 451a of the upper casing 450a, and lower ends of the respective secondary cyclones 300 are fitted in the through holes 454a.

Further, a plurality of bolt holes 456a are formed near the outer edge 451a of the upper casing 450a. Furthermore, a plurality of female screws 458a are formed on a lower end surface of the outer edge 451a of the upper casing 450a.

Figure 15:
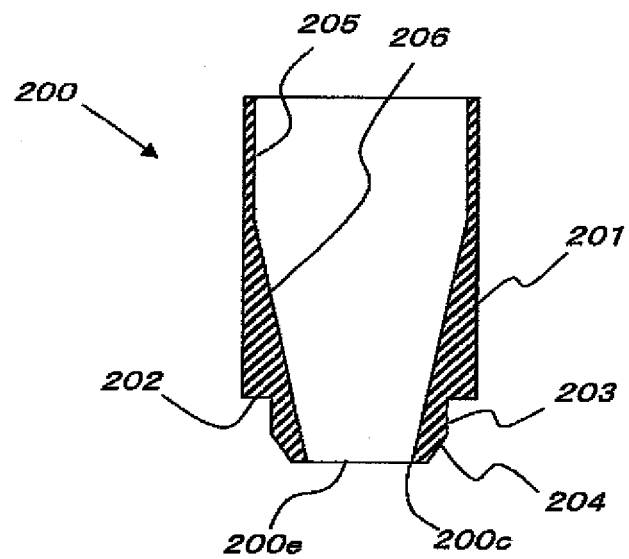
FIG. 15 is a vertical cross-sectional view of a primary cyclone of a pump device according to the third embodiment.

Here, an example of a cross-sectional shape of the primary cyclone 200 is shown in FIG. 15. In FIG. 15, the primary cyclone 200 has a cylindrical shape as a whole, and it has a large-diameter portion 201 which constitutes the majority of an entire length, a small-diameter portion 203, and a taper distal end portion 204. A step portion 202 is provided at a boundary between the large-diameter portion 201 and the small-diameter portion 203.

A cylindrical inner portion of the primary cyclone 200 has a cylindrical space portion 205 on an opening side (the upper side in FIG. 15) of the large-diameter portion 201, a taper space portion 206 is provided to be continuous with this cylindrical space portion, and a diameter of the taper space portion 206 is reduced toward the lower end 200e of the primary cyclone 200. Here, the lower end of the taper space portion 206 serves as a primary cyclone outlet 200c.

In FIG. 20, the small-diameter portion 203 (refer to FIG. 15) of the primary cyclone 200 is fitted in the through hole 452a of the upper casing.

In FIG. 20, the partition plate 450b of the impeller casing 450 has a discoid shape as a whole, and a through hole 452b is formed at the center of this plate. Furthermore, a plurality of bolt holes 454b are formed near the outer edge of the partition wall 450b. A plurality of bolt holes 454b are formed to be equal with female screw 458a in number, and positions of the plurality of bolt holes 454b coincide with projecting positions of the plurality of female screws 458a formed on the upper casing 450a.

In FIG. 20, a diameter of the through hole 452b in the partition plate 450b is substantially equal to a diameter of a region of the impeller 400 where the blades 402 are not formed (a region having the plate-like member 401 alone).

The entire lower casing 450c of the impeller casing 450 is formed into a shape like a bowl with a cylindrical outer edge.

An outlet 452c from which an operating fluid (an operating fluid containing contaminations: e.g., a coolant containing chips and others) is expelled is formed in a side portion of the outer edge 451c of the lower casing 450c.

Bolt holes 454c are formed in a lower end surface of the cylindrical outer edge 451c at the same positions as projecting positions of the bolt holes 454b. The number of the bolt holes 454c is the same as the number of the bolt holes 454b in the partition plate 450b.

In a state that the upper casing 450a, the partition plate 450b, and the lower casing 450c are integrated by (a plurality of) fastening bolts B45 in a state that these members (450a, 450b, and 450c) are laminated. The state that the upper casing 450a, the partition plate 450b, and the lower casing 450c are integrated by the fastening bolts B45 is represented as an "impeller casing 450" in the specification and the accompanying drawings.

The impeller casing 450 comprises a first space Ca formed of the upper casing 450a and the partition plate 450b and a second space Cb formed of the partition plate 450b and the lower casing 450c.

Further, the impeller 400 is arranged in the second space Cb.

It is to be noted that, as different from the embodiment shown in FIG. 1 to FIG. 11, a discharge rate of the impeller 400 does not necessarily exceed a discharge rate of the trochoidal pump 9 in each embodiment shown in FIG. 12 to FIG. 30.

A flow of the operating fluid (e.g., a coolant used for cooling a machine tool) in the pump device P3 will now be described with reference to FIG. 16 to FIG. 20.

Figure 16:
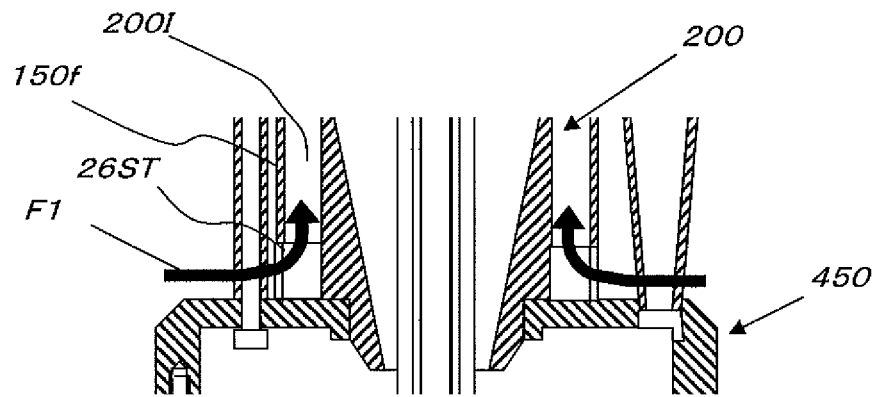
FIG. 16 is a cross-sectional view showing a flow of a coolant until the coolant flows into a primary cyclone in the third embodiment.
Figure 21:
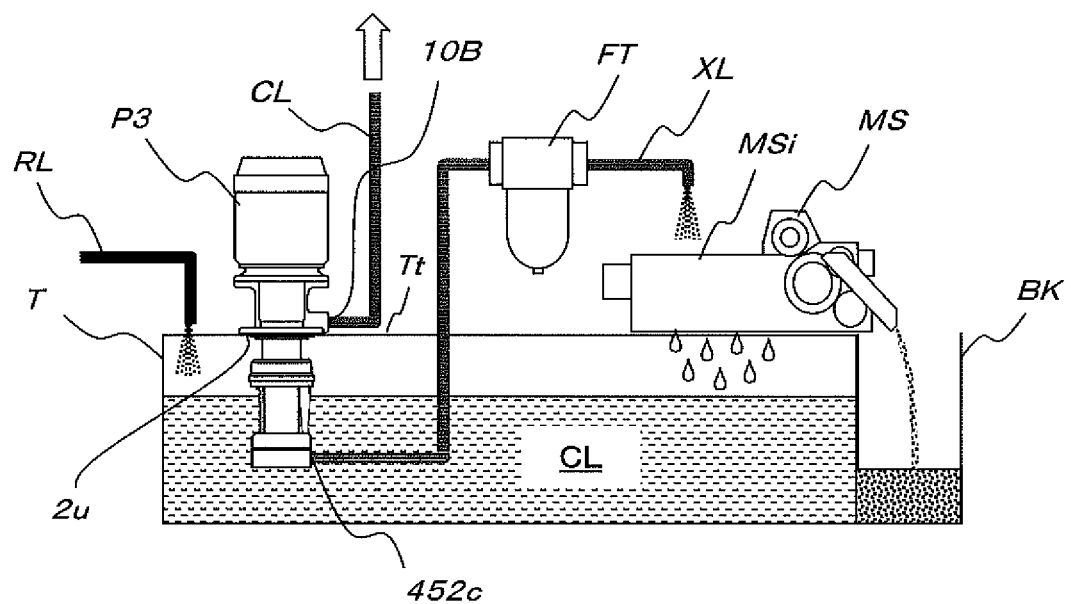
FIG. 21 is a view showing device arrangement in a case that the pump device according to the third embodiment is used for supply of a coolant for a machine tool.

Although not clear in FIG. 16, a region below the trochoidal pump 9 in the pump device P3 is immersed in the coolant (liquid) in the coolant tank T as shown in FIG. 21.

At the time of starting up the pump device P3, the region of the device from the bottom to the upper end portion of the strainer 26ST must be immersed in the operating fluid (the coolant). In FIG. 16, since the pump device P3 is immersed in the coolant (liquid) in the coolant tank T, when the pump device P3 is started up, the coolant which is the operating fluid immediately flows into an annular space 200I from the strainer 26ST (an arrow F1). Here, the annular space 200I is formed between the primary cyclone 200 and the cyclone casing 150f in the radial direction.

The coolant that has flowed into the annular space 200I turns to a swirl flow and flows upward (an arrow F2) (in FIG. 17) in the annular space 200I, and it flows into the primary cyclone 200 from a gap (a primary cyclone inlet: a non-illustrated notch provided in the guide member 150g) between the upper end of the primary cyclone 200 and the guide member 150g (an arrow F3). Here, the coolant is sucked into the primary cyclone 200 by suction force of the trochoidal pump 9 and the impeller 400.

The coolant that has flowed into the primary cyclone 200 flows in a spiral in the annular space formed of the extended shaft 6C and the inner periphery of the primary cyclone 200 and descends in the primary cyclone 200 (an arrow F4).

Although not shown, helical blades may be formed on the inner peripheral surfaces of the primary cyclone 200 and each secondary cyclone 300 so that helical swirl flows can be easily generated.

Figure 17:
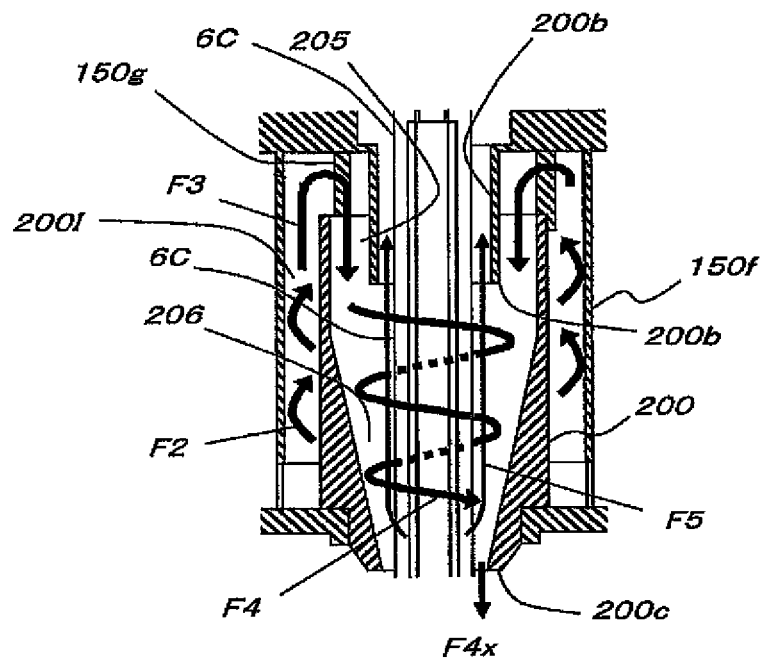
FIG. 17 is a cross-sectional view showing a flow of the coolant after the coolant has flowed into the primary cyclone in the third embodiment.

As obvious from FIG. 17, a radial dimension in the primary cycle 200 is reduced as getting closer to the lower side (a diameter is reduced). Therefore, the coolant is subjected to pressure rise as it flows downward in the primary cyclone 200. Furthermore, the coolant changes into an upward flow (turns around) in the primary cyclone 200 (an arrow F5), and it ascends in the central portion in the primary cyclone 200.

As indicated by the arrow F4, large foreign substances (contaminations) included in the coolant move downward while the coolant turns to the swirl flow and descends in the primary cyclone 200. The foreign substances (contaminations) and the excess coolant that have descended are discharged into the first space Ca (refer to FIG. 12 and FIG. 20) of the impeller casing 450 from the primary cyclone outlet 200c as indicated by an arrow F4x.

In FIG. 18, the coolant (the arrow F5) that has ascended in the primary cyclone 200 flows into each secondary cyclone 300 from each secondary cyclone intake 300a through the guide grooves 200a formed in the central member 150b of the central casing 150 as indicated by an arrow F6.

The coolant that has flowed into each secondary cyclone 300 turns to a swirl flow and descends in the secondary cyclone 300 (an arrow F7).

Since an inner diameter of each secondary cyclone 300 is smaller than an inner diameter of the primary cyclone 200, a circumferential velocity of the swirl flow F7 of the coolant produced in each secondary cyclone 300 is higher than a circumferential velocity of the swirl flow F4 in the primary cyclone 200 as long as a flow rate does not change.

Therefore, small foreign substances that were not able to be removed by the primary cyclone 200 are separated from the coolant by the swirl flow F7 having the higher flow velocity (the circumferential velocity) than that of the swirl flow in the primary cyclone 200.

The foreign substances (the relatively small foreign substances: contaminations) separated from the coolant are discharged into the first space Ca (refer to FIG. 12 and FIG. 20) of the impeller casing 450 from each secondary cyclone outlet 300c at the lower end of each secondary cyclone 300 as indicated by an arrow F8.

In each secondary cyclone 300, likewise, a radial dimension is reduced (a diameter is reduced) as getting closer to the lower side, and therefore the coolant is subjected to pressure rise when it descends in the secondary cyclone 300. Moreover, the coolant changes into an upward flow (turns around) in each secondary cyclone 300 (an arrow F9), and it ascends in the central portion in the secondary cyclone 300.

Figure 19:
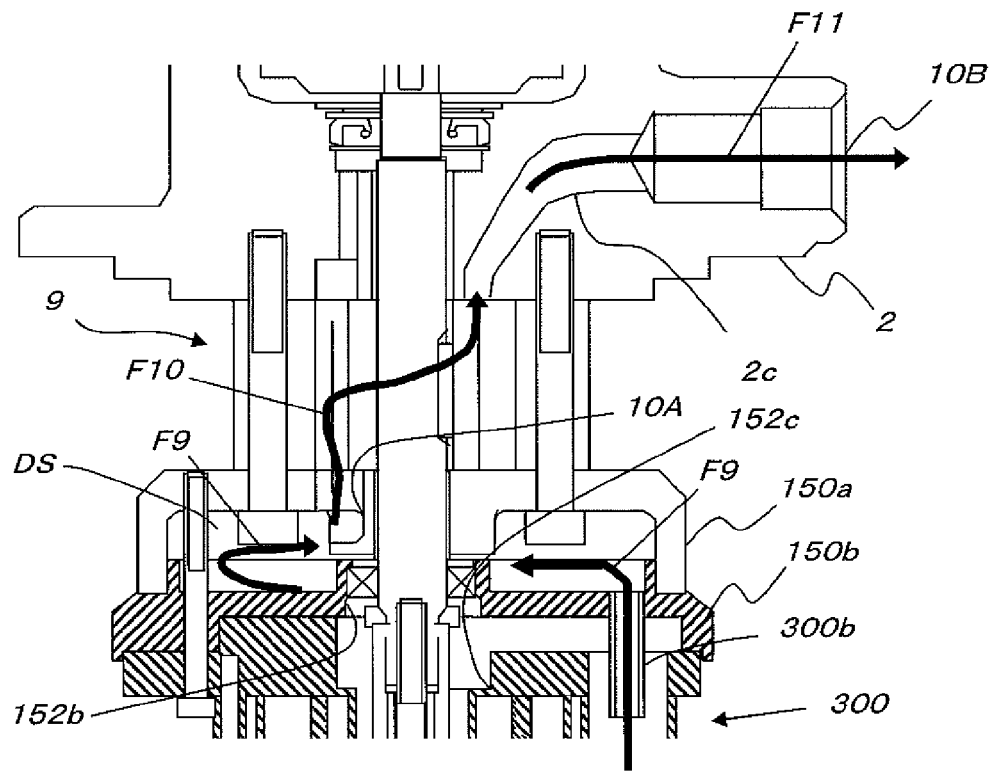
FIG. 19 is a cross-sectional view showing a flow of the coolant that has flowed out from the secondary cyclone and is discharged from a pump discharge port.

In FIG. 19, the coolant that has ascended in each secondary cyclone 300 flows into an annular space DS from each secondary cyclone outlet 300b (the arrow F9). The annular space DS is constituted of the upper member 150a and the central member 150b in the central casing 150.

The coolant that has flowed into the annular space DS flows into the trochoidal pump 9 through the pump intake 10A formed in the upper member 150a, and it is pressurized (an arrow F10).

The coolant that has been pressurized by the trochoidal pump 9 flows through a flow channel 2c and is discharged from the pump discharge port 10B as indicated by an arrow F11. Additionally, the coolant is supplied to a machine tool (not shown in FIG. 19) through a supply system that is not shown in FIG. 19.

In FIG. 20, the impeller 400 arranged in the second space Cb of the impeller casing 450 is driven by rotation of the electric motor 1. When the impeller 400 rotates, a negative pressure is formed in the first space Ca.

A fluid (an arrow F4x) containing the foreign substances (the contaminations) expelled from the outlet 200c of the primary cyclone 200 and a fluid (an arrow F8) containing the foreign substances (the contaminations) expelled from the outlet 300c of each secondary cyclone 300 are sucked by the negative pressure in the first space Ca, and they flow into the first space Ca. Further, they flow into the second space Cb via the through hole 452b in the partition plate 450b.

The fluid containing the foreign substances (the contaminations) that has flowed into the second space Cb is expelled from the outlet 452c formed in the lower member 450c (an arrow F14) when the impeller 400 rotates. The fluid containing the foreign substances (the contaminations) expelled from the outlet 452c is supplied to a predetermined processing device (e.g., a filter or a magnet separator) through a processing line that is not shown in FIG. 20, and the coolant and the foreign substances (the contaminations: chips and others) are segregated.

Here, in case of using the closed impeller 400B shown in FIG. 31 and FIG. 32, the fluid (the arrow F4x) containing the foreign substances (the contaminations) expelled from the outlet 200c of the primary cyclone 200 and the fluid (the arrow F8) containing the foreign substances (the contaminations) expelled from the outlet 300c of each secondary cyclone 300 flow into the first space Ca in FIG. 20, and then they flow into an intake 400Bi formed of the protruding portion 442 of the shroud 440 in FIG. 31.

Furthermore, the operating fluid that has flowed into the closed impeller 400B from the intake 400Bi is subjected to pressure rise by rotation of the impeller 400B, and it is discharged into the second space Cb (refer to FIG. 20) from the discharge port 400Bo.

Other structures are the same as those in the semi-open impeller 400 described with reference to FIG. 14 and FIG. 20.

FIG. 21 shows, e.g., a device (an equipment) that filters a coolant used in a machine tool by using the pump device P3 according to the third embodiment, again supplies the cleaned coolant to the machine tool, and separates metal pieces and others in contaminations collected by the pump device P3.

In FIG. 21, an attachment surface 2u of the platform portion 2 of the pump device P3 according to the third embodiment is disposed to an upper surface of a top lid portion Tt of the coolant tank T. The used coolant is returned to the coolant tank T from the machine tool (not shown) through a return line RL. Further, a coolant supply line CL is connected to the discharge port 10B of the pump device P3 and communicates with the non-illustrated machine tool.

A contamination processing line XL is connected to the outlet 452c of the pump device P3 and communicates with a portion immediately above a treatment liquid input port MSi of a magnet separator MS.

A line filter FT is interposed in the contamination processing line XL. A line filter FT removes foreign substances. After the line filter FT has removed the foreign substances, the coolant treatment liquid containing iron-based chips is discharged to the treatment input port MSi of the magnet separator MS.

In the magnet separator MS, the iron-based chips are attracted by a magnetized roller (not shown), and the attracted chips are separated from the magnetized roller by predetermined means and collected in a chip collection box BK installed on the side of the coolant tank T.

Figure 22:
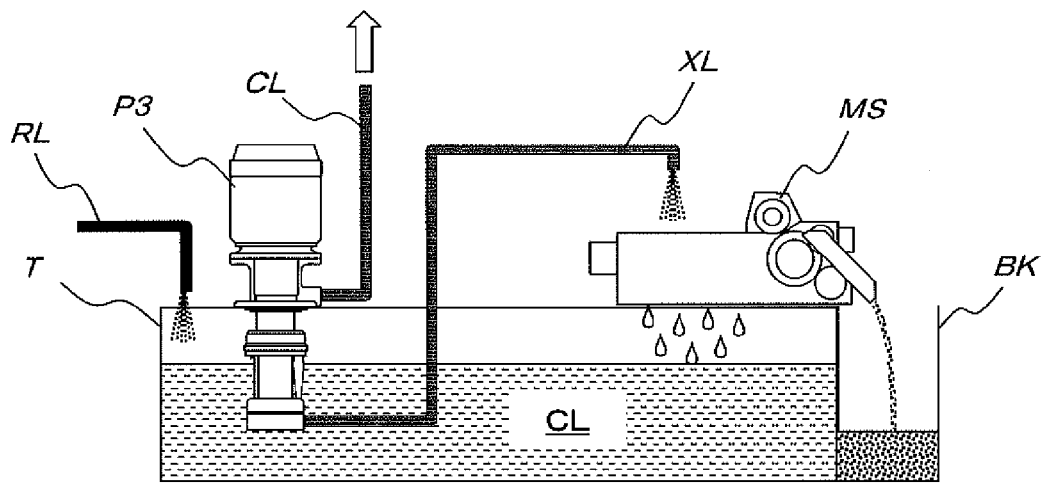
FIG. 22 is an explanatory view showing device arrangement in a case that the pump device according to the third embodiment is used for supply of a coolant for a machine tool, also showing a combination of devices different from FIG. 21.

FIG. 22 shows a contamination processing equipment different from that in FIG. 21. The line filter FT provided in the contamination processing line XL of the equipment shown in FIG. 21 is omitted in the equipment shown in FIG. 22.

The contamination processing equipment shown in FIG. 22 is used when the iron-based chips account for the great majority of the foreign substances in the coolant treatment liquid and removing the iron-based chips alone can suffice. Further, in the contamination processing equipment shown in FIG. 22, since the line filter FT is omitted, the maintenance of the contamination processing line XL is easier than that in the equipment shown in FIG. 21.

Figure 23:
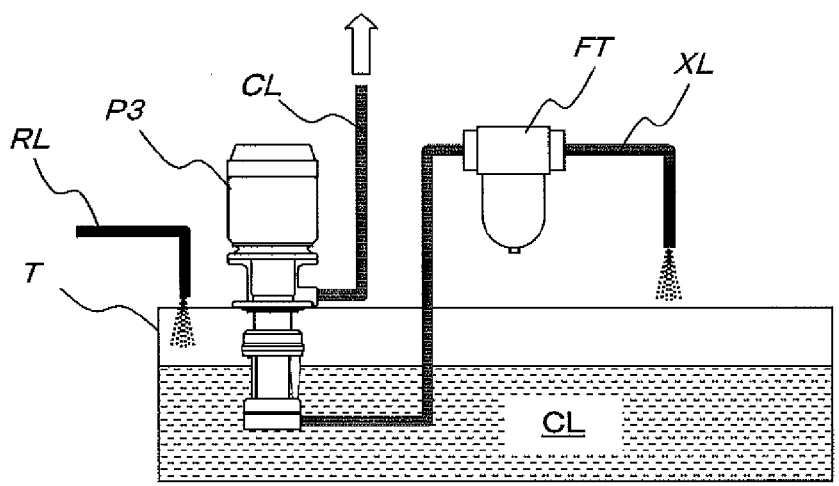
FIG. 23 is an explanatory view showing device arrangement in a case that the pump device according to the third embodiment is used for supply of a coolant for a machine tool, also showing a combination of devices different from FIG. 21 and FIG. 22.

A contamination processing equipment shown in FIG. 23 has a construction obtained by omitting the magnet separator MS from the equipment depicted in FIG. 21.

In the equipment shown in FIG. 23, since the magnet separator MS is omitted, investment in equipment and operating costs can be reduced as compared with the equipment shown in FIG. 21.

Figure 24:
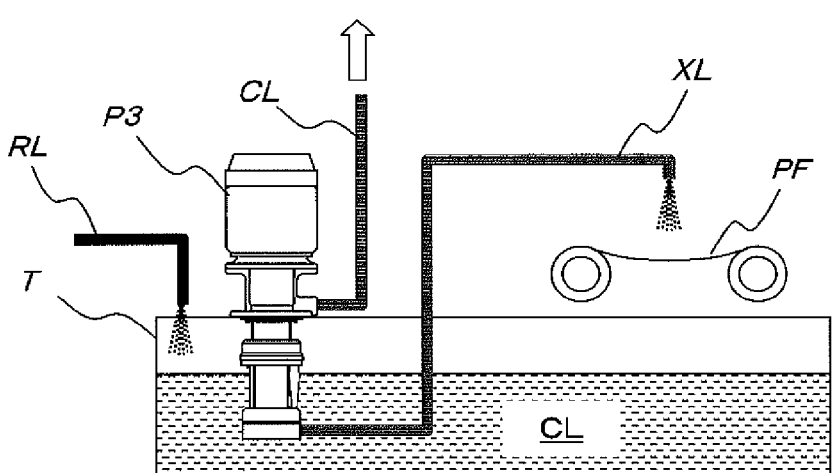
FIG. 24 is an explanatory view showing device arrangement in a case that the pump device according to the third embodiment is used for supply of a coolant for a machine tool, also showing a combination of devices different from FIG. 21, FIG. 22, and FIG. 23.

In a contamination processing equipment shown in FIG. 24, the magnet separator MS and the line filter FT are omitted from the equipment depicted in FIG. 21, and a paper filter PF is provided at a discharge port of a contamination processing line XL.

In the equipment shown in FIG. 24, since the magnet separator MS and the line filter FT are omitted, investment in equipment and operating costs can be suppressed as compared with the equipments shown in FIG. 21 to FIG. 23.

It is to be noted that, in the respective equipments shown in FIG. 21 to FIG. 24, the pump devices P4 to P6 according to the embodiments shown in FIG. 25 to FIG. 30 can be used in place of the pump device P3 according to the third embodiment.

Furthermore, the operating fluid (the coolant) expelled from the outlet 452c may be directly returned to the tank without using the respective equipments shown in FIG. 21 to FIG. 24.

According to the third embodiment shown in FIG. 12 to FIG. 24, the expelling impeller 400 is arranged near the primary cyclone 200 through the partition plate 450b. Moreover, the outlet 300c of each secondary cyclone 300 is opened to the first space Ca on the partition plate 450b.

Therefore, when the pump device P3 is operated and the expelling impeller 400 rotates, a negative pressure is formed in the first space Ca. Additionally, the coolant treatment liquid containing contaminations (the foreign substances) such as chips having a high weight volume ratio is efficiently sucked into the second space Cb from the outlet 200c of the primary cyclone 200 and the outlet 300c of each secondary cyclone 300, and it is expelled to the outside of the pump device P3 from the outlet 452c.

The foreign substances are removed from the coolant treatment liquid containing the contaminations expelled to the outside of the pump device P3 by, e.g., the line filter FT in the contamination processing line XL.

The iron-based chips are further removed from the coolant treatment liquid from which the foreign substances have been removed by the magnet separator, and the remaining coolant is collected in the coolant tank T.

Structures, functions, and effects other than those described in the third embodiment are the same as those in the first embodiment.

A fourth embodiment will now be described with reference to FIG. 25 and FIG. 26.

Figure 25:
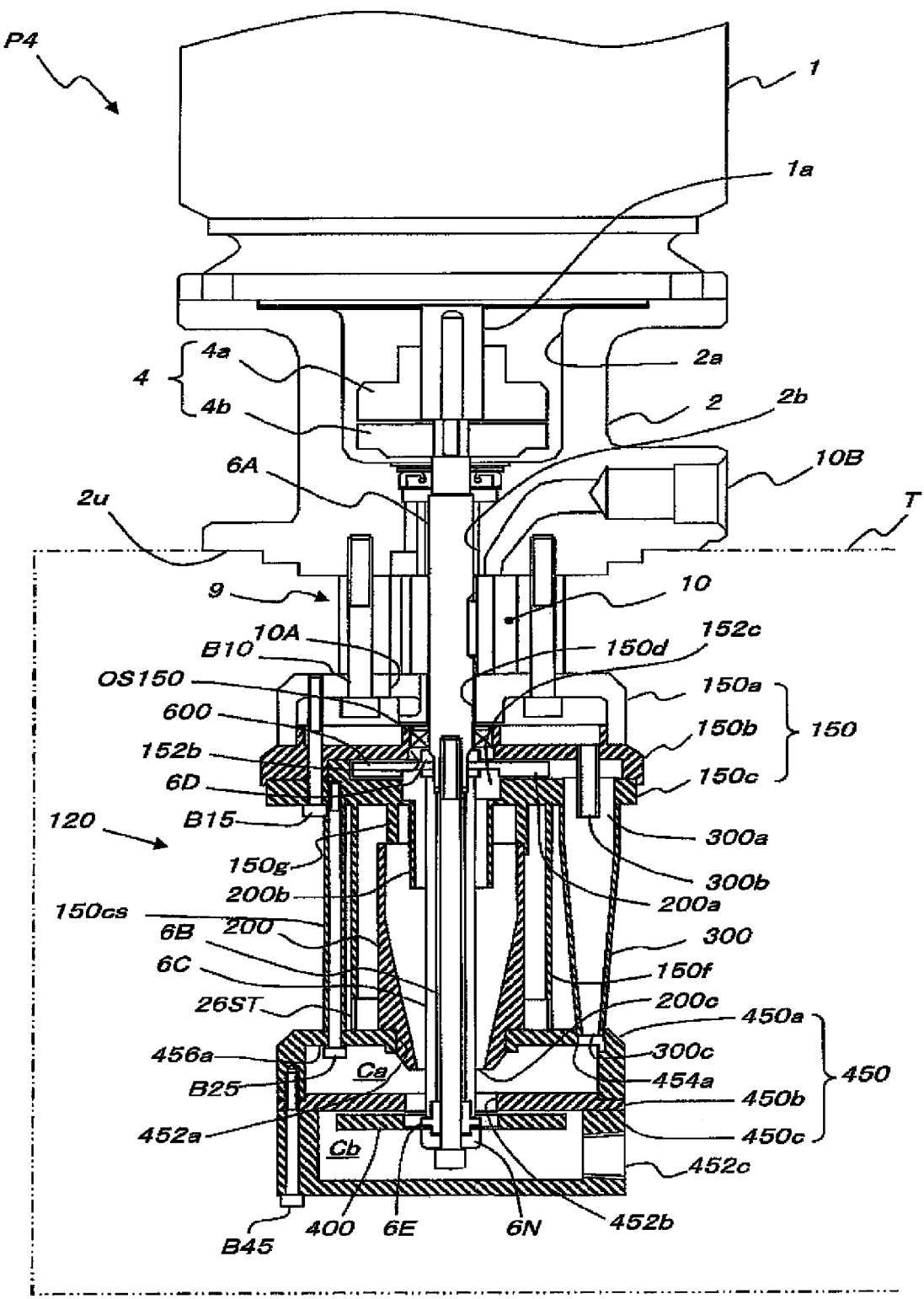
FIG. 25 is a sectional side elevation view showing a fourth embodiment according to the present invention.
Figure 26:
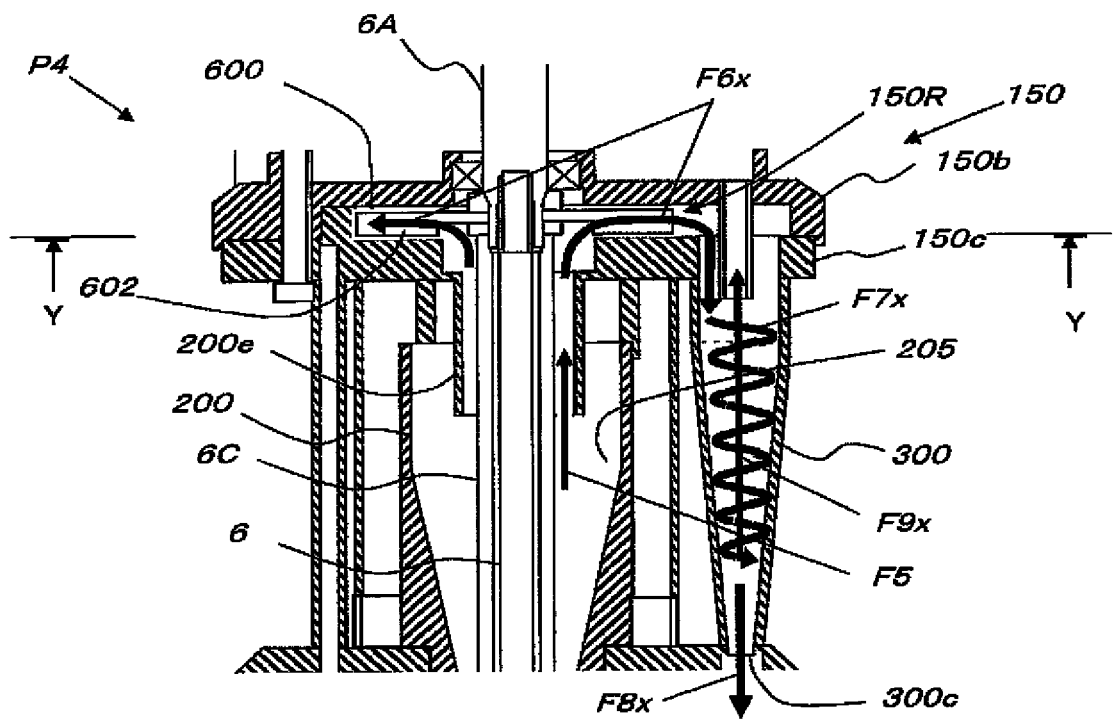
FIG. 26 is a cross-sectional view showing a flow of a coolant that has flowed out from a primary cyclone and has flowed into a secondary cyclone in the fourth embodiment.

In the fourth embodiment shown in FIG. 25 and FIG. 26, an entire pump device is denoted by reference numeral P4.

The fourth embodiment shown in FIG. 25 and FIG. 26 is different from the third embodiment shown in FIG. 12 to FIG. 24 in that a secondary impeller 600 is provided in a space having a circular cross section formed between a central member 150b and a lower member 150c in a central casing 150.

In other words, the fourth embodiment is associated with the second embodiment in that the secondary impeller is provided.

In the pump device P4 according to the fourth embodiment, as shown in FIG. 26, a space 150R having a circular cross section is formed between the central member 150b and the lower member 150c in the central casing 150.

In the space 150R having the circular cross section, the secondary impeller 600 having a blade surface 602 facing the lower side (in FIG. 26) is secured to a connecting portion of a pump shaft 6A and an extended shaft 6C. Furthermore, like an expelling impeller 400, the secondary impeller 600 is rotated and driven by an electric motor 1.

Here, the secondary impeller 600 is not restricted to such a semi-open impeller as shown in FIG. 14, and it may be such a closed impeller as indicated by reference numeral 400B as a whole in FIG. 31 and FIG. 32.

In the fourth embodiment, an operating fluid is sucked into a primary cyclone 200 by suction force of the impeller 400 and a trochoid 9 as well as suction force of the secondary impeller 600.

In FIG. 26, a head is further applied to a coolant (an arrow F5) that has ascended near the center in the primary cyclone 200 by the secondary impeller 600, and the coolant flows into a plurality of secondary cyclones 300 (an arrow F6x).

A pressure of a flow F7x of the coolant in each secondary cyclone 300 is increased as compared with the flow F7 of the coolant in each secondary cyclone 300 in the third embodiment since the flow F7x is accelerated by the secondary impeller 600. In regard to other points, the flows F7x, F8x, and F9x of the coolant shown in FIG. 26 have the same behaviors as the flows F7, F8, and F9 of the coolant shown in FIG. 18 (the third embodiment), and the coolant flows in the same manner.

A discharge rate of the secondary impeller 600 in the pump device P4 according to the fourth embodiment is set higher than a discharge rate of the trochoidal pump 9.

This setting is constructed in order to increase an internal pressure in each secondary cyclone 300 by the secondary impeller 600 and to prevent a negative pressure from being produced in each secondary cyclone 300.

According to the fourth embodiment, since the secondary impeller 600 is interposed between the primary cyclone 200 and the secondary cyclones 300, a pressure of a swirl flow F7x of the coolant in each secondary cyclone 300 further rises (as compared with the third embodiment), a circumferential velocity of the swirl flow indicated by the arrow F7x is further accelerated, and finer foreign substances can be separated (by each secondary cyclone 300).

Additionally, since the secondary impeller 600 applies the head and a discharge pressure in each secondary cyclone 300 rises, a negative pressure is not generated in each secondary cyclone 300 even if a negative pressure is produced at an intake 10A of the trochoidal pump 9. Therefore, the separation capacity for foreign substances in the secondary cyclones 300 is not deteriorated.

Structures, functions, and effects other than those described in the fourth embodiment are the same as the third embodiment.

A fifth embodiment will now be described with reference to FIG. 27 to FIG. 29.

Figure 28:
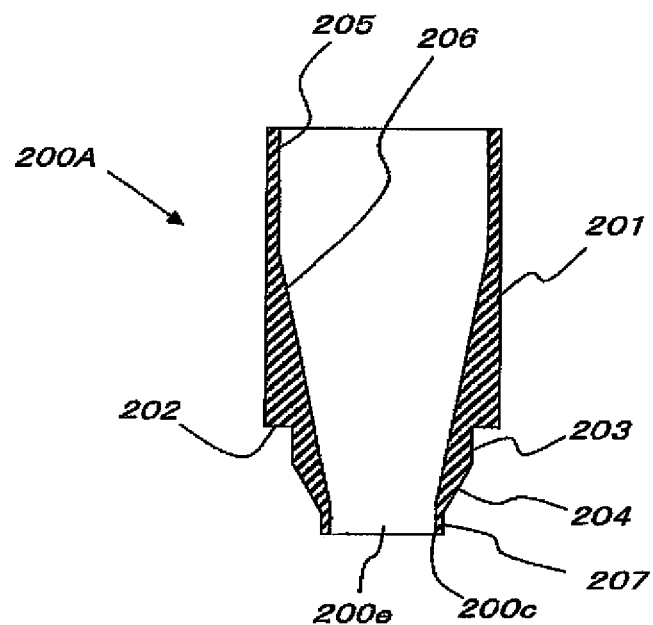
FIG. 28 is a vertical cross-sectional view of a primary cyclone of a pump device according to the fifth embodiment.
Figure 29:
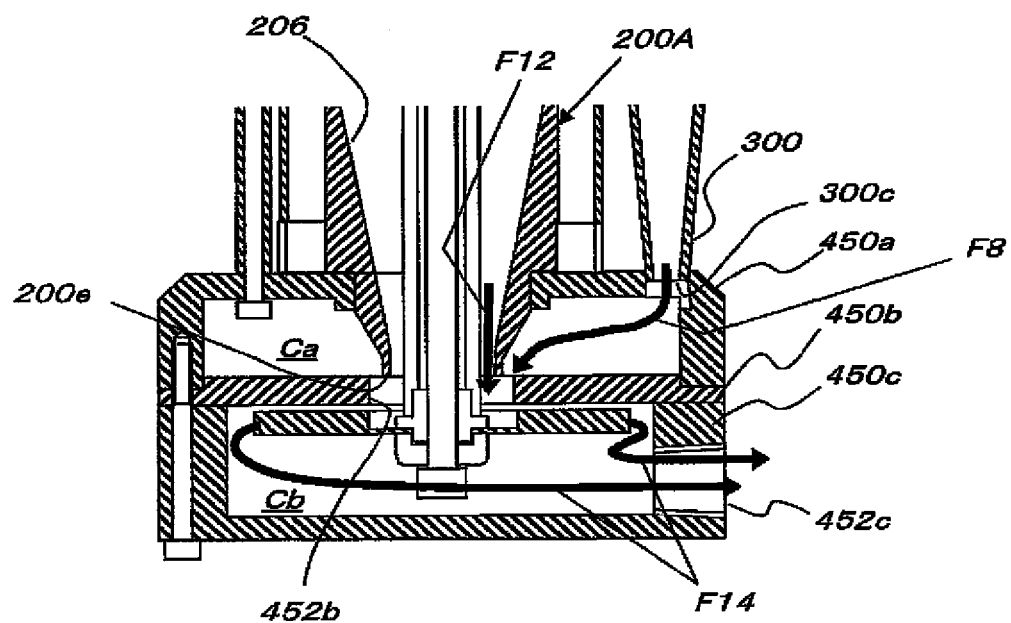
FIG. 29 is a vertical cross-sectional view of an impeller casing showing a state that a coolant is expelled from an expelling impeller in the fifth embodiment.
Figure 27:
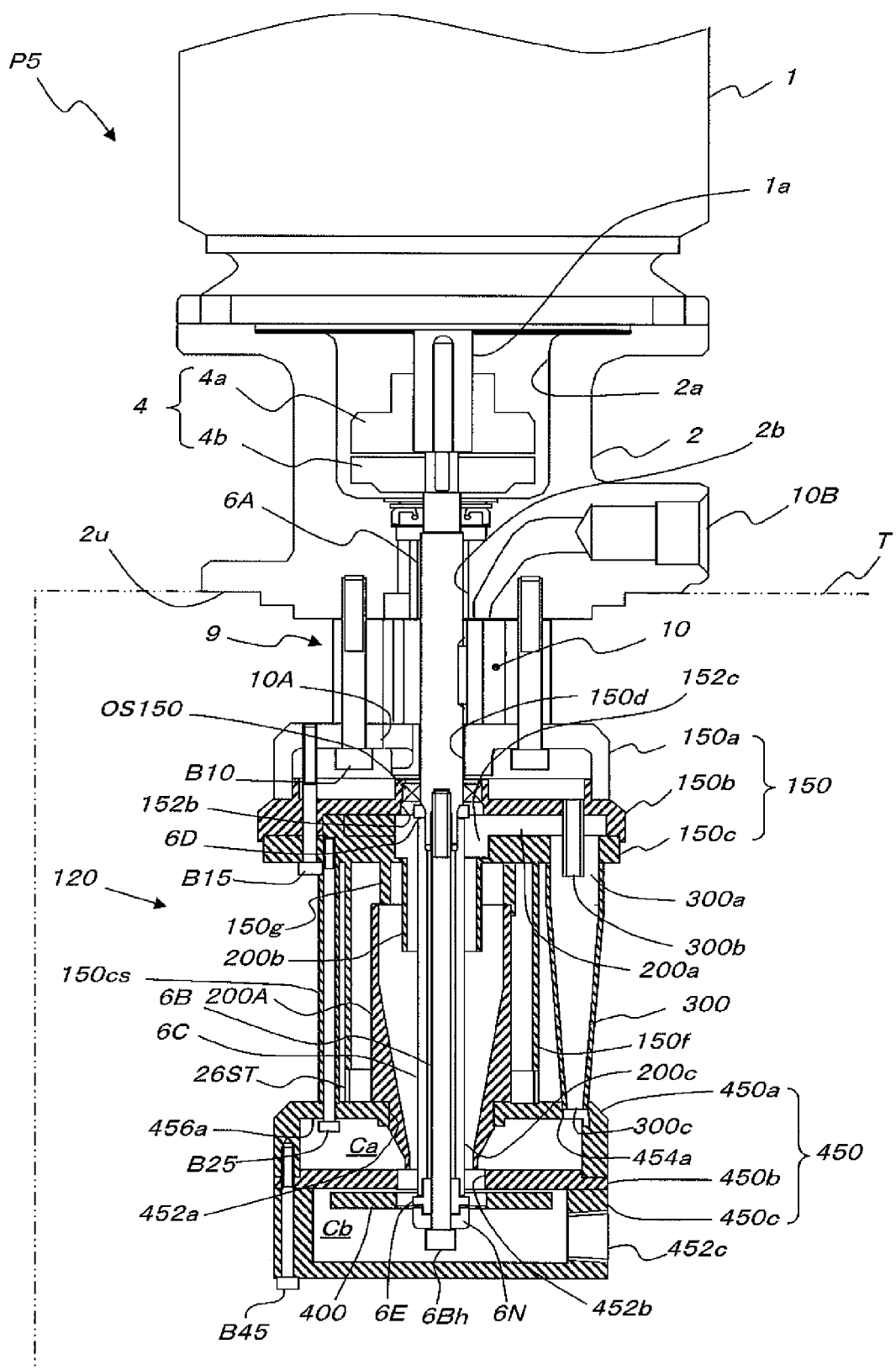
FIG. 27 is a sectional side elevation view showing a fifth embodiment according to the present invention.

According to the fifth embodiment shown in FIG. 27 to FIG. 29, in a pump device denoted by reference numeral P5 as a whole, an axial dimension of a primary cyclone 200A is set longer than an axial dimension of the primary cyclone 200 in the third embodiment shown in FIG. 12 to FIG. 20.

Therefore, in the fifth embodiment shown in FIG. 27 to FIG. 29, a lower end portion of the primary cyclone 200A is extended to a discharge side (a lower side in the drawings) as compared with the third embodiment shown in FIG. 12 to FIG. 20.

In FIG. 28, the primary cyclone 200A used in the fifth embodiment has a large-diameter portion 201, a small-diameter portion 203, a taper portion 204, and a distal end diameter reducing portion 207. A boundary between the large-diameter portion 201 and the small-diameter portion 203 is a step portion 202.

In the primary cyclone 200A according to the fifth embodiment, a shape from the large-diameter portion 201 to the small-diameter portion 203 is the same but an axial dimension from the taper portion 204 to the distal end diameter reducing portion 207 is long as compared with the primary cyclone 200 according to the third embodiment. Further, a lower end 200e of the primary cyclone 200A according to the fifth embodiment is extended downward as compared with the lower end 200e of the primary cyclone 200 according to the third embodiment.

As obvious from a comparison between FIG. 20 (the third embodiment) and FIG. 29 (the fifth embodiment), a lower end position of the primary cyclone 200 is present in the first space Ca in the third embodiment (FIG. 20). However, the lower end of the primary cyclone 200 can be also constructed to be present outside the first space Ca. On the other hand, as shown in FIG. 29, in the fifth embodiment, the lower end of the primary cyclone 200A is placed at the lower end of the first space Ca, it is provided at a position near a partition plate 450b.

As shown in FIG. 29, in the fifth embodiment, since the lower end of the primary cyclone 200A is extended to the position near the partition plate 450b, even if suction force of an expelling impeller 400 (force for sucking a flow F12 of a coolant containing contaminations from the primary cyclone 200A and a flow F8 of the coolant containing the contaminations from each secondary cyclone 300 into a second space Cb) is reduced, it is possible to prevent the flow F8 of the coolant containing the contaminations expelled from the secondary cyclones 300 from flowing back into the primary cyclone 200A or prevent the flow F12 of the coolant containing the contaminations from the primary cyclone 200A from flowing back into the secondary cyclones 300.

Even if the flow F8 of the coolant containing the contaminations expelled from the secondary cyclones 300 is about to flow back into the primary cyclone 200A, this flow is blocked by the primary cyclone 200A having the lower end provided at the position near the partition plate 450b.

Moreover, even if the flow F12 of the coolant containing the contaminations from the primary cyclone 200A is about to flow back into the secondary cyclones 300, since the lower end of the primary cyclone 200A is placed near the partition plate 450b, this flow directly enters the second space Cb by the suction force of the expelling impeller 400.

Structures, functions, and effects other than those described in the fifth embodiment shown in FIG. 27 to FIG. 29 are the same as the third embodiment shown in FIG. 12 to FIG. 24.

A sixth embodiment will now be described with reference to FIG. 30.

Figure 30:
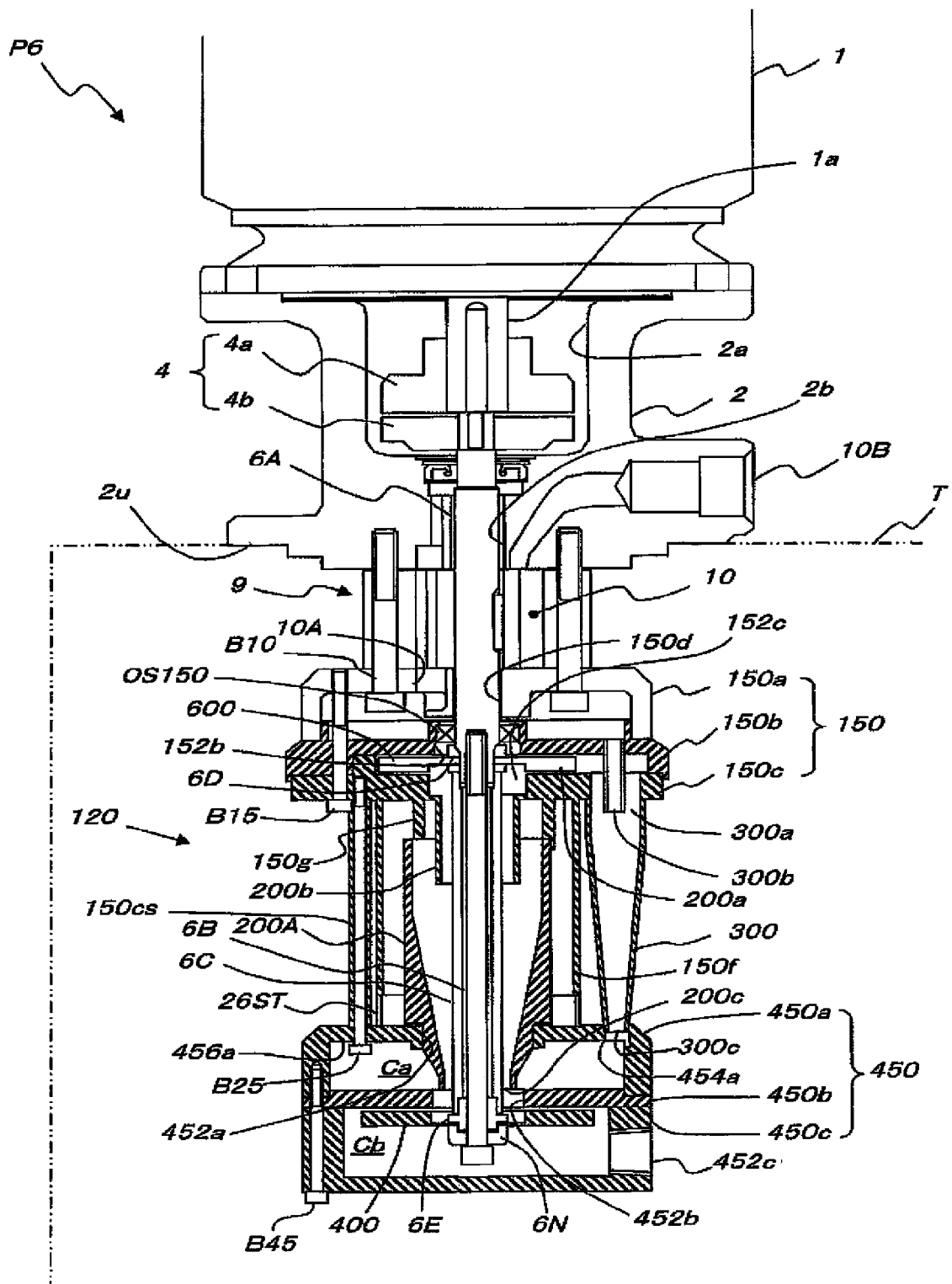
FIG. 30 is a sectional side elevation view showing a sixth embodiment of the present invention.

An entire pump device according to the sixth embodiment shown in FIG. 30 is designated by reference numeral P6.

The sixth embodiment shown in FIG. 30 is different from the fifth embodiment shown in FIG. 27 to FIG. 29 in that a secondary impeller 600 is provided in a space having a circular cross section between a central member 150b and a lower member 150b in a central casing 150.

In other words, the sixth embodiment shown in FIG. 30 is an embodiment which is a combination of the fourth embodiment shown in FIG. 25 and FIG. 26 and the fifth embodiment shown in FIG. 27 to FIG. 29.

In the sixth embodiment shown in FIG. 30, since the secondary impeller 600 is interposed between a primary cyclone 200 and secondary cyclones 300 with respect to the fifth embodiment shown in FIG. 27 to FIG. 29, a pressure in each secondary cyclone 300 further rises and a velocity of a swirl flow of a coolant is further increased as compared with the fifth embodiment. Consequently, as compared with the fifth embodiment, finer foreign substances (contaminations) are separated from the coolant by the secondary cyclones 300.

Additionally, since a head is applied by the secondary impeller 600 and a discharge pressure in each secondary cyclone 300 rises, even if a negative pressure is generated at an intake 10A of a trochoidal pump 9, a negative pressure is not produced in each secondary cyclone 300.

It is to be noted that, like the second embodiment, a discharge rate of the secondary impeller 600 is set higher than a discharge rate of the trochoidal pump 9 in the fifth embodiment.

Structures, functions, and effects other than those described in the sixth embodiment shown in FIG. 30 are the same as the fifth embodiment in FIG. 27 to FIG. 29.

The graphical embodiments are just illustrations, and they do not restrict the technical scope of the present invention. For example, in place of the impellers 40, 400, and 600, a mixed flow pump, an axial flow pump, a centrifugal pump, and any other radial flow pump can be used.

Further, in the graphical embodiments, the coolant for a machine tool is used as an example of the operating fluid, but the pump device according to each embodiment can be used for sewage water, polluted water, a mud flow, and others.

REFERENCE NUMERALS LIST

T . . . coolant tank
Ta . . . liquid level
1 . . . electric motor
1a . . . drive shaft
2 . . . platform portion
4 . . . coupling
4a . . . upper coupling
4b . . . lower coupling
6 . . . shaft
6A . . . pump shaft
6B . . . insertion bolt
6C . . . extended shaft
6D . . . seat member
9 . . . trochoidal pump
10 . . . rotor
10A . . . pump intake
10B . . . pump discharge port
12 . . . cyclone filter
15 . . . central casing
15a . . . upper member
15b . . . central member
15c . . . lower member
20 . . . primary cyclone
20a . . . guide groove
20b . . . primary cyclone outflow
20c . . . primary cyclone outlet
20d . . . primary cyclone intake
26 . . . cyclone casing
26ST, 50 . . . strainer
30 . . . secondary cyclone
30a . . . secondary cyclone intake
30b . . . secondary cyclone outflow
30c . . . secondary cyclone outlet
40, 400, 400B . . . impeller
40a . . . impeller intake
45 . . . impeller casing
45a . . . impeller upper casing
45b . . . impeller lower casing
45c . . . casing intake
60 . . . secondary impeller
60c . . . secondary impeller casing
120 . . . cyclone filter
150 . . . central casing
150a . . . upper member
150b . . . central member
150c . . . lower member
150d . . . through hole
150f . . . cyclone casing
150g . . . guide member
200 . . . primary cyclone
200a . . . guide groove
200b . . . primary cyclone outflow
200c . . . primary cyclone outlet
300 . . . secondary cyclone
300a . . . secondary cyclone intake
300b . . . secondary cyclone outlet
450 . . . impeller casing
450a . . . upper casing
450b . . . partition plate
450c . . . lower casing
600 . . . secondary impeller

The invention claimed is:

1. A pump device, comprising:
a positive-displacement pump;
a cyclone filter operably coupled to the positive-displacement pump, the cyclone filter being provided on an intake side of the positive-displacement pump; and
a non-positive-displacement pump operably coupled to the cyclone filter, the non-positive displacement pump being provided on an intake side of the cyclone filter,
wherein:
the cyclone filter comprises a primary cyclone and secondary cyclones,
each of the primary cyclone and the secondary cyclones expels therein separated foreign substances,
the secondary cyclones are arranged at outward positions in a radial direction of the primary cyclone,
a secondary non-positive-displacement pump is arranged in a space through which an outflow of the primary cyclone and an intake of the secondary cyclone communicate with each other so that a coolant forms a flow directing outwards in the radial direction of the primary cyclone when the secondary non-positive-displacement pump rotates,
a discharge rate of the non-positive-displacement pump is set higher than a discharge rate of the positive-displacement pump, and
the positive-displacement pump, the cyclone filter, and the non-positive-displacement pump are linearly arranged in the vertical direction.

2. A pump device, comprising:
a positive-displacement pump;
a cyclone filter operably coupled to the positive-displacement pump, the cyclone filter being provided on an intake side of the positive-displacement pump; and
a non-positive-displacement pump operably coupled to the cyclone filter, the non-positive displacement pump being provided on an outlet side of the cyclone filter,
wherein:
the cyclone filter comprises a primary cyclone and secondary cyclones,
each of the primary cyclone and the secondary cyclones expels therein separated foreign substances,
the secondary cyclones are arranged at outward positions in a radial direction of the primary cyclone,
a secondary non-positive-displacement pump is arranged in a space through which an outflow of the primary cyclone and an intake of the secondary cyclone communicate with each other so that a coolant forms a flow directing outwards in the radial direction of the primary cyclone when the secondary non-positive-displacement pump rotates,
the positive-displacement pump, the cyclone filter, and the non-positive-displacement pump are linearly arranged in the vertical direction, and
the non-positive-displacement pump has a function for sucking an operating fluid containing the foreign substances expelled from the primary cyclone and the secondary cyclones.

3. The pump device according to claim 2,
wherein a partition that separates a space communicating with outlets of the secondary cyclones from a space accommodating the ion-positive-displacement pump is provided, and a lower end portion of an outlet of the primary cyclone is extended to a position close to the partition.

\* \* \* \* \*